US006664956B1

(12) United States Patent
Erdem

(10) Patent No.: US 6,664,956 B1
(45) Date of Patent: *Dec. 16, 2003

(54) METHOD FOR GENERATING A PERSONALIZED 3-D FACE MODEL

(75) Inventor: A. Tanju Erdem, Rochester, NY (US)

(73) Assignee: Momentum Bilgisayar, Yazilim, Danismanlik, Ticaret A. S., Istanbul (TR)

(*) Notice: Subject to any disclaimer, the term of this patent is extended or adjusted under 35 U.S.C. 154(b) by 261 days.

This patent is subject to a terminal disclaimer.

(21) Appl. No.: 09/689,186

(22) Filed: Oct. 12, 2000

(51) Int. Cl.[7] .................................................. G06T 17/00

(52) U.S. Cl. .......................................... 345/419; 345/473

(58) Field of Search ................................. 345/418, 419, 345/420, 473, 474

(56) References Cited

U.S. PATENT DOCUMENTS

| 4,975,960 A | 12/1990 | Petajan |
| 5,280,530 A | 1/1994 | Trew et al. |
| 5,744,953 A | 4/1998 | Hansen |
| 5,774,591 A | 6/1998 | Black et al. |
| 5,802,220 A | 9/1998 | Black et al. |
| 5,805,745 A | 9/1998 | Graf |
| 5,807,284 A | 9/1998 | Foxlin |
| 5,907,626 A | 5/1999 | Toklu et al. |
| 5,923,337 A | 7/1999 | Yamamoto |
| 5,982,909 A | 11/1999 | Erdem et al. |
| 6,009,210 A | 12/1999 | Kang |
| 6,016,148 A | 1/2000 | Kang et al. |
| 6,020,892 A | 2/2000 | Dillon |
| 6,028,960 A | 2/2000 | Graf et al. |
| 6,031,539 A | 2/2000 | Kang et al. |
| 6,037,949 A | 3/2000 | DeRose et al. |
| 6,047,078 A | 4/2000 | Kang |
| 6,052,132 A | 4/2000 | Christian et al. |
| 6,064,390 A | 5/2000 | Sagar et al. |

FOREIGN PATENT DOCUMENTS

| EP | 0 926 628 A | 6/1999 |
| EP | PCT/IB01/02735 | 6/2002 |
| EP | PCT/IB01/02736 | 7/2002 |
| EP | PCT/IB01/02363 | 8/2002 |
| JP | 8293026 A | 11/1996 |
| WO | WO 98 01830 | 1/1998 |
| WO | WO 9906962 A | 2/1999 |

OTHER PUBLICATIONS

Lavagetto, Fabio, et al., "The Facial Animation Engine: Toward a High–Level Interface for the Design of MPEG–4 Comliant Animated Faces", *IEEE Transactions on circuits and Systems for Video Technology*, vol. 9, No. 2, pp. 277–289, (Mar. 1999).

(List continued on next page.)

*Primary Examiner*—Cliff N. Vo
(74) *Attorney, Agent, or Firm*—Thomas R. Fitzgerald, Esq.

(57) ABSTRACT

A method for generating a 3-D model of a person's face is disclosed. The 3-D face model carries both the geometry (shape) and the texture (color) characteristics of the person's face. The shape of the face model is represented via a 3-D triangular mesh (geometry mesh), while the texture of the face model is represented via a 2-D composite image (texture image). The geometry mesh is obtained by deforming a predefined standard 3-D triangular mesh based on the dimensions and relative positions of the person's facial features, such as eyes, nose, ears, lips, chin, etc. The texture image is obtained by compositing a set of 2-D images of the person's face which are taken from particular directions such as front, right, left, etc, and modifying them along region boundaries to achieve seamless stitching of color on the 3-D face model. The directional images are taken while the mouth is closed and the eyes are open. In order to capture the color information of the facial regions that are not visible in the directional images, i.e., the inside of the mouth and the outside of the eyelids, additional 2-D images are also taken and included in the texture image.

47 Claims, 16 Drawing Sheets

OTHER PUBLICATIONS

Antunes, Gabriel, et al., "MPEG–4 Facial Animation Technology: Survey, Implementation, and Results", *IEEE Transactions on Circuits and Systems for Video Technology*, vol. 9, No. 2, pp. 290–305, (Mar. 1999).

Tomasi, Carlo, et al., "Shape and Motion From Image Streams Under Orthography: A Factorization Method", *International Journal of Computer Vision*, vol. 9, No. 2, pp. 137–154, (1992).

Szeliski, Richard, et al., "Recovering 3D Shape and Motion From Image Streams Using Nonlinear Least Squares", *Journal of Visual Communication and Image Representation*, vol. 5, No. 1., pp. 10–28, (Mar. 1994).

Lavagetto, Fabio, et al., "MPEG–4 Compliant Calibration of 3D Head Models", *Picture Coding Symposium*, pp. 217–220, (1999).

Poelman, Conrad J., et al., "A Paraperspective Factorization Method for Shape and Motion Recovery", *Carnegio Mellon University Technical Report*, CMU–CS–93–219, pp. 1–36, (Dec. 11, 1993).

Dorai, Chitra, et al., "Registration and Integration of Multiple Object Views for 3D Model Construction", *IEEE Transactions on Pattern Analysis and Machine Intelligence*, vol. 20, No. 1, pp. 83–89, (Jan. 1998).

Akimoto, Takaaki, et al., "Automatic Creation of 3D Facial Models", *IEEE Computer Graphics & Applications*, pp. 16–22, (Sep. 1993).

Seferidis, Vassills, et al., "General Approach to BlockMatching Motion Estimation", *Optical Engineering*, vol. 32, No. 7, pp. 1464–1474.

Escher, Marc, et al., "Automatic 3D Cloning and Real–Time Animation of a Human Face", *Proceedings of Computer Animation*, Geneva, Switzerland, pp. 1–13, (1997).

Li–An Tang et al: "Analysis–based facial expression synthesis" Proceedings of the International Conference of Image Processing (ICIP) Austin, Nov. 13–16, 1994 Los Alamitos, IEEE Comp. Soc. Press, US, vol. 3 Conf. 1, Nov. 13, 1994, pp. 98–102 XP010146456 ISBN: 0–8186–6952–7 the whole document.

Cosi P et al: "Phonetic recognition by recurrent neural networks working on audio and visual information" Speech Communication, Elsevier Science Publishers, Amsterdam, NL, vol. 19, No. 3, Sep. 1, 1996, pp. 245–252, XP004013654 ; ISSN: 0167–6393 p. 246, right hand column, line 13–page 248, right–hand column, line 7.

Guenther, Brian; Grimm, Cindy; Wood, Daniel; Malvar, Henrique; Pighin Fredrick: "Making faces" Computer Graphics, Proceedings. Siggraph 98 Conference Proceedings, Proceedings of Siggraph 98: 25th International Conference on Computer Graphics and Interactive Techniques, Orlando, FL.

USA, Jul. 19–24, 1998, pp. 55–66, XP002205956 1998, New York, NY, USA, ACM, USA ISBN: 0–89791–999–8 p. 56, paragraph 2 –p. 59, paragraph 3.3.3.

Ebihara K et al: Real–Time 3–D Facial Image Reconstruction for Virtual Space Teleconferencing Electronics & Communications in Japan, Part III–Fundamental Electronic Science, Scripta Technica, NY, US, vol. 82, No. 5, May 1999, pp. 80–90, XP000875659 ISSN:1042–0967 p. 80, left–hand column, line 1–p. 81, rt–hand col, ln 5.

Chen T: "Technologies for building networked collaborative environments" Image Processing, 1999. ICIP 99. Proceedings. 1999 International Conference on Kobe, Japan Oct. 24–28, 1999, Piscataway, NJ, USA, IEEE; US, Oct. 24, 1999, pp. 16–20, XP010368845, ISBN: 0–7803–5467–2, p. 18, paragraph 2.3–p. 19, paragraph 2.4.

Lande C et al: "An MPEG–4 facial animation system driven by synthetic speech" Multimedia Modeling, 1998. MMM '98. Proceedings. 1998 Lausanne, Switzerland Oct. 12–15, 1998, Los Alamitos, CA. USA, IEEE Comput. Soc. US, Oct. 12, 1998, pp. 203–212, XP010309519, ISBN: 0–8186–8911–0, p. 1, left–hand column, line 1–p. 207, right–hand column, line 30.

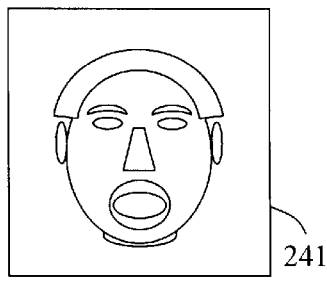
241
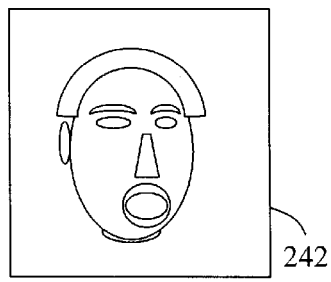
242
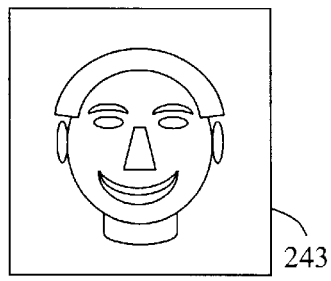
243
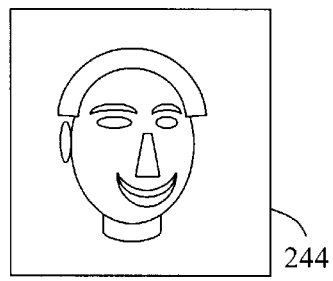
244
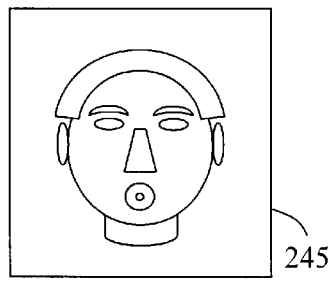
245
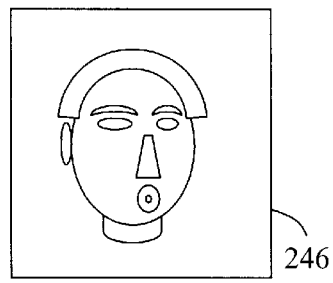
246
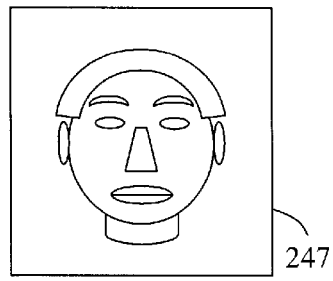
247
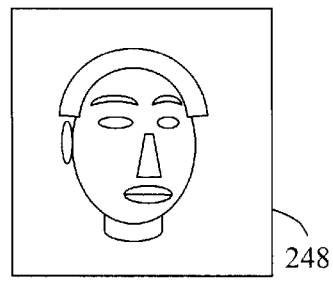
248
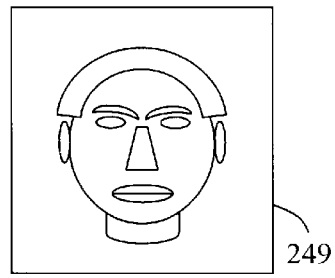
249
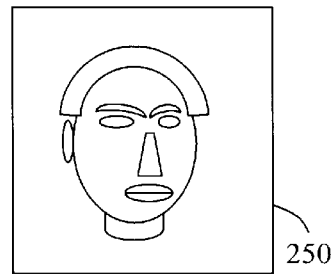
250
FIG. 6

| Feature Points → / Neutral Images ↓ | Right Pupil 251 | Left Pupil 252 | Right Eyebrow 253 | Left Eyebrow 254 | Right Nose Corner 255 | Left Nose Corner 256 | Right Ear Top 257 | Right Ear Bottom 258 | Left Ear Top 259 | Left Ear Bottom 260 | Right Mouth Corner 261 | Left Mouth Corner 262 | Lip Center 263 |
|---|---|---|---|---|---|---|---|---|---|---|---|---|---|
| Front 221 | X | X | X | X | X | X | X | X | X | X | X | X | X |
| Forehead 222 | X | X | X | X | X | X | X | X | X | X | X | X | X |
| Chin 223 | X | X | X | X | X | X | X | X | X | X | X | X | X |
| Angled-right 224 | X | X | X | X | X |  | X | X |  |  | X | X | X |
| Angled-right-tilted-down 225 | X | X | X | X | X |  | X | X |  |  | X | X | X |
| Angled-right-tilted-up 226 | X | X | X | X | X |  | X | X |  |  | X | X | X |
| Angled-left 227 | X | X | X | X |  | X |  |  | X | X | X | X | X |
| Angled-left-tilted-down 228 | X | X | X | X |  | X |  |  | X | X | X | X | X |
| Angled-left-tilted-up 229 | X | X | X | X |  | X |  |  | X | X | X | X | X |
| Full-right-profile 230 | X |  | X |  | X |  | X | X |  |  | X |  | X |
| Full-right-profile-tilted-down 231 | X |  | X |  | X |  | X | X |  |  | X |  | X |
| Full-right-profile-tilted-up 232 | X |  | X |  | X |  | X | X |  |  | X |  | X |
| Full-left-profile 233 |  | X |  | X |  | X |  |  | X | X |  | X | X |
| Full-left-profile-tilted-down 234 |  | X |  | X |  | X |  |  | X | X |  | X | X |
| Full-left-profile-tilted-up 235 |  | X |  | X |  | X |  |  | X | X |  | X | X |

FIG. 8

| Feature Points → <br><br> Action Images ↓ | Right Pupil 251 | Left Pupil 252 | Right Eyebrow 253 | Left Eyebrow 254 | Right Nose Corner 255 | Left Nose Corner 256 | Right Ear Top 257 | Right Ear Bottom 258 | Left Ear Top 259 | Left Ear Bottom 260 | Right Mouth Corner 261 | Left Mouth Corner 262 | Lip Center 263 |
|---|---|---|---|---|---|---|---|---|---|---|---|---|---|
| Front-mouth-yawning 241 | X | X | X | X | X | X | X | X | X | X | | | |
| Angled-right-mouth-yawning 242 | X | X | X | X | X | | X | X | | | | | |
| Front-mouth-smiling 243 | X | X | X | X | X | X | X | X | X | X | | | |
| Angled-right-mouth-smiling 244 | X | X | X | X | X | | X | X | | | | | |
| Front-mouth-kissing 245 | X | X | X | X | X | X | X | X | X | X | | | |
| Angled-right-mouth-kissing 246 | X | X | X | X | X | | X | X | | | | | |
| Front-raised-eyebrows 247 | X | X | | | X | X | X | X | X | X | X | X | X |
| Angled-right-raised-eyebrows 248 | X | X | | | X | | X | X | | | X | X | X |
| Front-squeezed-eyebrows 249 | X | X | | | X | X | X | X | X | X | X | X | X |
| Angled-right-squeezed-eyebrows 250 | X | X | | | X | | X | X | | | X | X | X |

FIG. 9

METHOD FOR GENERATING A PERSONALIZED 3-D FACE MODEL

FIELD OF THE INVENTION

The present invention is related to the field of computer generated modeling, and more specifically, to a technique for generating a personalized three-dimensional (3-D) face model from a sequence of two-dimensional (2-D) images of a person's face.

BACKGROUND OF THE INVENTION

Generation of a 3-D face model of a person involves mapping a real image of the face of the person onto a 3-D triangular mesh that has been shaped to have the same or similar geometry as the face of the person. 3-D triangular mesh refers to a connected set of triangular patches in 3-D whose corners form the nodes of the mesh. Each triangular patch in the 3-D mesh acquires its image data from an associated triangular region in the image of the face.

The methods disclosed in the prior art for generating a 3-D face model can be generally classified as those that involve (i) a fully manual process, (ii) a semi-automatic process and (iii) a fully-automatic process. In a fully manual process, every triangular patch of the 3-D mesh has to be manually mapped onto the image of the face according to the facial features of the face. Fully manual processes are labor intensive and time consuming because the number of triangular patches in the 3-D mesh could range from a hundred to several thousands.

There are known techniques for using markers to track selected facial features such as the eyebrows, ears, mouth and corners of the eyes.

Semi-automatic processes rely on automatically detecting or manually marking certain features on the face, such as eyes, nose and mouth, and initialize the 3-D mesh by an affine warping of a standard 3-D mesh based on the location of the detected facial features. However, a global affine transformation generally does not match the many local facial dimensions. Thus, the locations of the nodes are fine-tuned in a manual process for each person.

Fully automatic processes drastically reduce the time required to map an image onto a 3-D mesh. However, while hardware based fully automatic processes are very costly, software based fully automatic processes are very sensitive to the image data and thus may not consistently produce accurate 3-D face models.

In addition to a 3-D mesh that matches the geometry of the face, a composite image that contains facial image data from various viewing directions also needs to be constructed. In the prior art, the composite image is a mosaic (or sprite) image of the face that is produced either by a 3-D rotating camera or by stitching a number of 2-D images of the face. While the former process is very costly, the latter one is generally very inaccurate.

Hence, there is a need for a fast, inexpensive, and accurate method for generating the 3-D mesh and texture image for a face model. The present invention proposes a semi-automatic method for generating the 3-D mesh with minimal manual fine tuning. The present invention also proposes a simpler and more general technique for generating the texture image, that involves only concatenating and color blending the 2-D images of the face.

SUMMARY OF THE INVENTION

The present invention provides an improvement designed to satisfy the aforementioned needs. Particularly, the present invention is directed to a computer program product for creating a 3-D face model from a plurality of 2-D images of a person's face, by performing the steps of: (a) receiving the plurality of images of a person; (b) obtaining the geometry mesh by deforming a predefined standard 3-D triangular mesh based on the dimensions and relative positions of the person's facial features; and (c) obtaining the texture image by compositing a plurality of 2-D images of the person taken from particular directions and modifying them in boundary regions to achieve seamless stitching of color for the 3-D face model.

BRIEF DESCRIPTION OF THE DRAWINGS

In the course of the following detailed description, reference will be made to the attached drawings in which:

FIG. 6 is a diagram further illustrating the method of acquiring a plurality of images of a person's face using the camera;

FIG. 8 is a first table further illustrating the method of FIG. 7;

FIG. 9 is a second table further illustrating the method of FIG. 7;

DETAILED DESCRIPTION OF THE INVENTION

Figure 1:
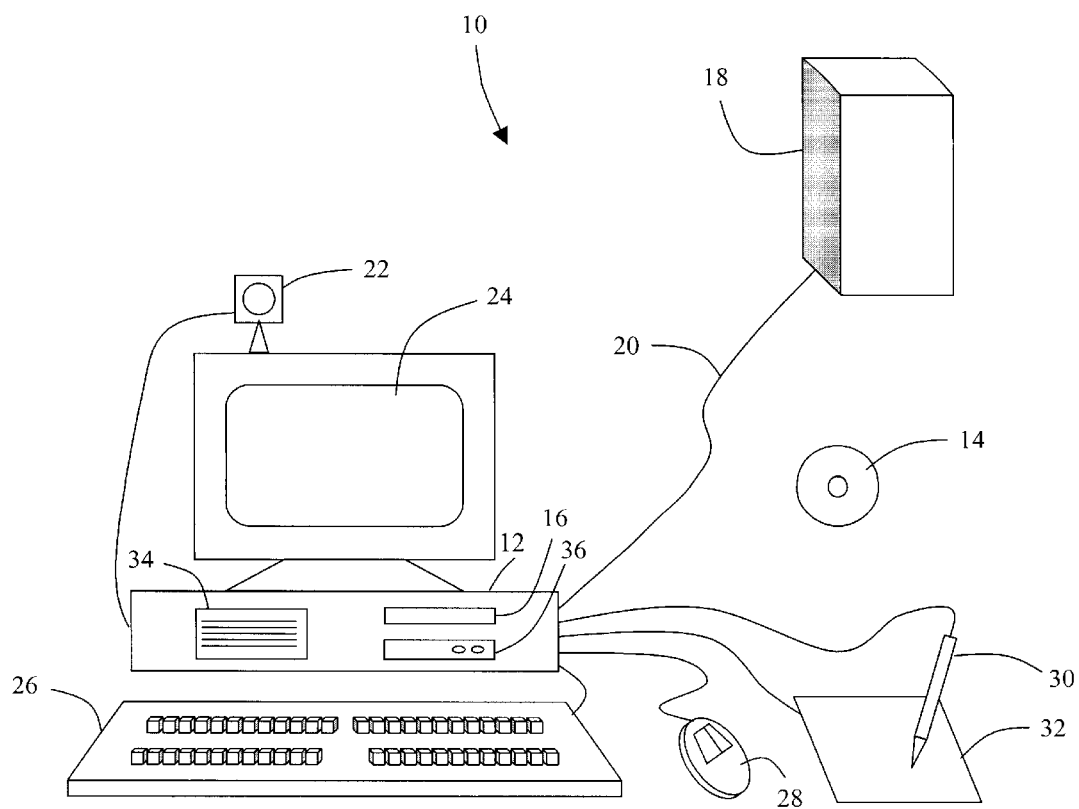
FIG. 1 is a perspective view of a computer system for implementing the present invention.

Referring to FIG. 1, there is illustrated a computer system 10 for implementing the present invention. The computer system 10 includes a microprocessor-based unit 12 for receiving and processing software programs and for performing other well known processing functions. The software programs are contained on a computer useable medium 14, typically a compact disk, and are input into the microprocessor-based unit 12 via the compact disk player 16 electronically connected to the microprocessor-based unit 12. As an alternate to using the compact disk 14, programs could also be contained in an Internet server 18 and input into the microprocessor-based unit 12 via an Internet connection 20. A camera 22 is electronically connected to the microprocessor-based unit 12 to capture the 2-D images of a person's face. A display 24 is electronically connected to the microprocessor-based unit 12 for displaying the images and user related information associated with the software. A keyboard 26 is connected to the microprocessor based unit 12 for allowing a user to input information to the software. A mouse 28 is also connected to the microprocessor based unit 12 for selecting items on the display 24 or for entering 2-D position information to the software, as is well known in the art. As an alternate to using the mouse 28, a digital pen 30 and a digital pad 32 may be used for selecting items on the display 24 and entering position information to the software. The output of the computer system is either stored on a hard disk 34 connected to the microprocessor unit 12, or uploaded to the Internet server 18 via the Internet connection 20. Alternatively, the output of the computer system can be stored on another computer useable medium 14, typically a compact disk, via a compact disk writer 36.

Figure 2:
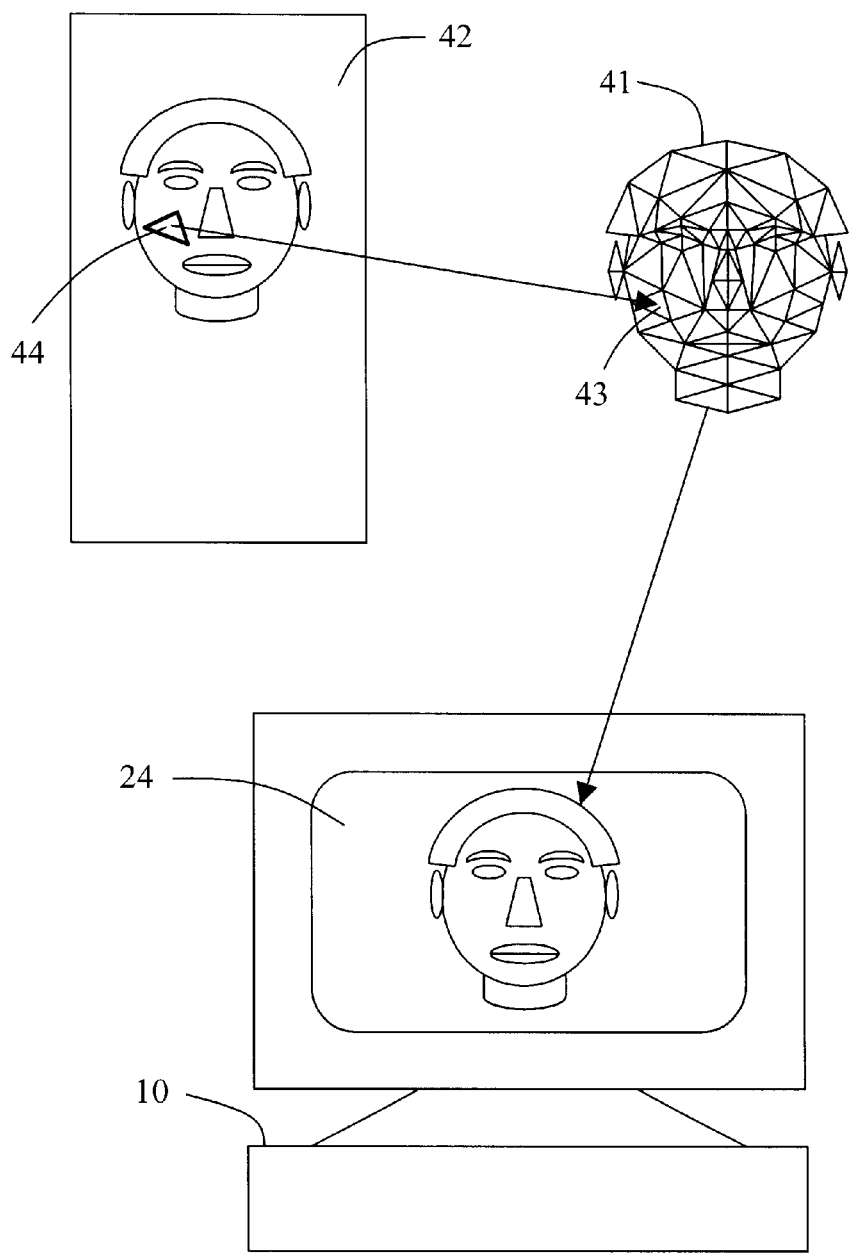
FIG. 2 is a diagram illustrating the method of present invention.

The below-described steps of the present invention are implemented on the computer system 10. Before describing the steps of the present invention, it will facilitate understanding to have an understanding of the following terms. Referring to FIG. 2, 3-D face model is composed of a 3-D triangular mesh (geometry mesh) 41 and a 2-D composite image (texture image) 42. 3-D triangular mesh refers to a connected set of triangular patches in 3-D whose corners form the nodes of the mesh. Each triangular patch 43 in the geometry mesh 41 is associated with a triangular region 44 in the texture image 42. In order to render the face model of a person on the display 24 of the computer system 10, the outside surface of each triangular patch 43 in the geometry mesh 41 is painted with the image data contained in its corresponding triangle 44 in the texture image 42. Image data are transferred from a triangle 44 in the texture image 42 to its counterpart 43 in the geometry mesh 41 via an affine transform which is well known to anyone knowledgeable in the field of image processing.

Figure 3:
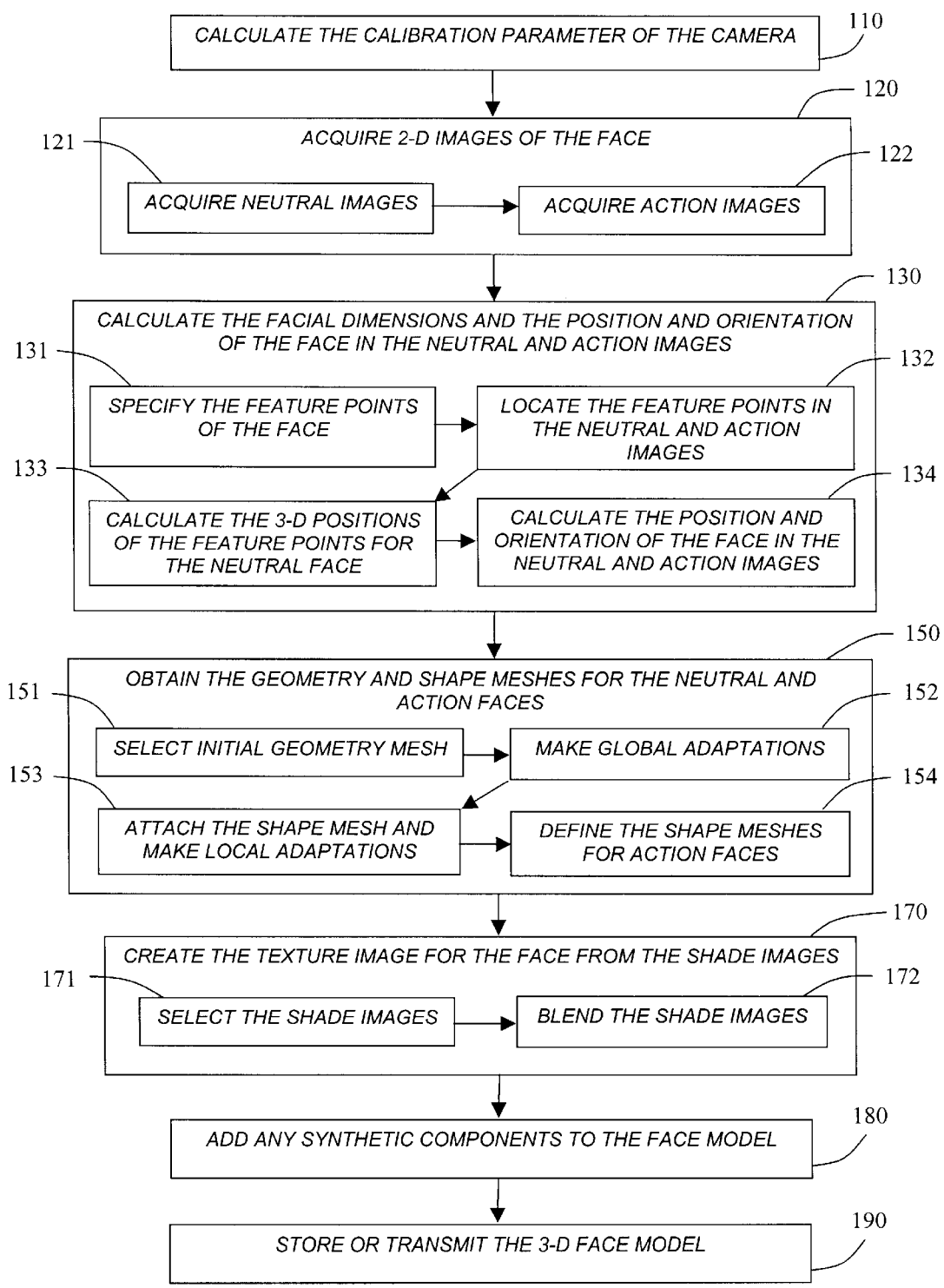
FIG. 3 is a flowchart for the method of the present invention.

Referring to FIG. 3, there are illustrated the seven steps of the present invention which are first succinctly outlined and later described in detail. Briefly stated, the seven steps are as follows: (a) calculating the calibration parameter of the camera (Step 110); (b) acquiring a plurality of images of a person's face using the camera (Step 120); (c) calculating the facial dimensions and the position and orientation of the face in the acquired images (Step 130); (d) obtaining a geometry mesh and an associated shape mesh for the face (Step 140); (e) creating a texture image for painting the surface of the deformed geometry mesh (Step 150); (f) adding any synthetic components to the face model (Step 160); (g) storing or transmitting the face model (Step 170).

A. Calculating the Calibration Parameter of the Camera (Step 110)

Figures 4A, 4B:
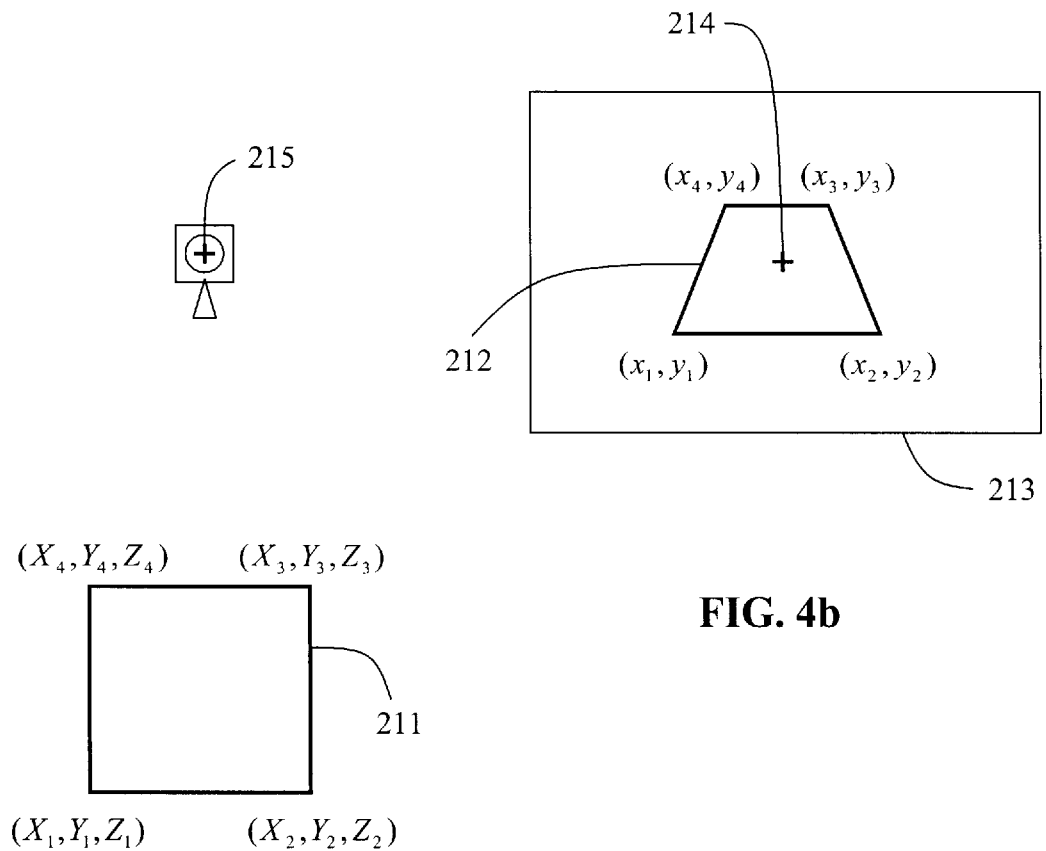
FIG. 4a is a diagram illustrating the method of calculating the calibration parameter of the camera with a target object.
FIG. 4b is a diagram illustrating the image of the target object captured by the camera.

Referring to FIGS. 4a and 4b, in the first step 110, a perspective image of a target object is captured with the camera with the target object being placed at approximately the same distance from the camera as the person's face. The method of the present invention uses the perspective image of the target object to calculate a camera parameter that is used in the subsequent steps, hereinafter referred to as the E parameter. It is instructive to note at this point that the E parameter has a non-negative value and it is a measure of the amount of perspective deformation caused by the camera. A zero value indicates no perspective deformation and the larger the value of the E parameter the more the perspective deformation caused by the camera.

Still referring to FIGS. 4a and 4b, in a preferred embodiment of the invention, a square-shaped object 211 is employed as the target object and the value of the E parameter of the camera is calculated as follows: First, the four corners of the quadrilateral 212 are either automatically detected or manually marked by a user on the image 213 of the object captured by the camera. Let $(x_n, y_n)$, n=1,2,3,4, represent 2-D the coordinates of the four corners of the object expressed in units of pixels with respect to the center 214 of the image 213. Letting $(X_n, Y_n, Z_n)$, n=1,2,3,4, represent the corresponding 3-D coordinates of the corners of the object in 3-D in units of meters with respect to the location 215 of the camera, the relationship between the 2-D and 3-D coordinates are mathematically expressed as follows:

$$x_n = \frac{X_n}{Z_n} FD,$$

$$y_n = \frac{Y_n}{Z_n} FD,$$

where F denotes the focal length of camera in meters, and D denotes the meter to pixel conversion factor. For the purpose of present invention, it is necessary to find only the value of the product FD. In the present invention, we refer to the inverse of this product as the E parameter, hence in mathematical terms $$E = \frac{1}{FD}.$$

We also take advantage of the fact that the target object is square shaped and planar, hence letting $\alpha I$ denote the 3-D vector from $(X_1, Y_1, Z_1)$ to $(X_2, Y_2, Z_2)$ and $\alpha J$ denote the 3-D vector from $(X_1, Y_1, Z_1)$ to $(X_4, Y_4, Z_4)$, where I and J are orthonormal vectors and $\alpha$ is the size of the square, we have the following mathematical expressions for the 3-D positions of the corners of the square object:

$$(X_2, Y_2, Z_2) = (X_1, Y_1, Z_1) + \alpha I,$$
$$(X_3, Y_3, Z_3) = (X_1, Y_1, Z_1) + \alpha I + \alpha J,$$
$$(X_4, Y_4, Z_4) = (X_1, Y_1, Z_1) + \alpha J.$$

It is well known to anyone having knowledge in the field of 3-D geometry that the pair of 3-D orthonormal vectors (I,J) are specified uniquely with 3 real numbers. Thus, on the right hand side of the above equation set there is a total of 7 unknown real numbers defining the square object: 3 in (I,J), 3 in $(X_1, Y_1, Z_1)$, and the size of the square $\alpha$. Hence, including the E parameter, the following set of equations $$x_n = \frac{1}{E} \cdot \frac{X_n}{Z_n},$$

$$y_n = \frac{1}{E} \frac{Y_n}{Z_n},$$

has a total of 8 unknown real numbers on the right hand side, and 8 measured quantities, namely $(x_n, y_n)$, n=1,2,3,4, on the left hand side, resulting in a unique solution for the unknown real numbers in terms of the measured quantities. It is well known to anyone knowledgeable in the field of algebra how to obtain the value of the E parameter from the above equation set given only the measured quantities $(x_n, y_n)$, n=1,2,3,4.

B. Acquiring a Plurality of Images of a Person's Face Using the Camera (Step 120)

Referring to FIG. 3, the method of acquiring a plurality of images of a person's face using the camera comprises the steps of (1) acquiring neutral images of the face (Step 121); and (2) acquiring action images of the face (Step 122). In the following, a detailed description of these steps is given.

B1. Acquiring Neutral Images of the Face (Step 121)

Figure 5:
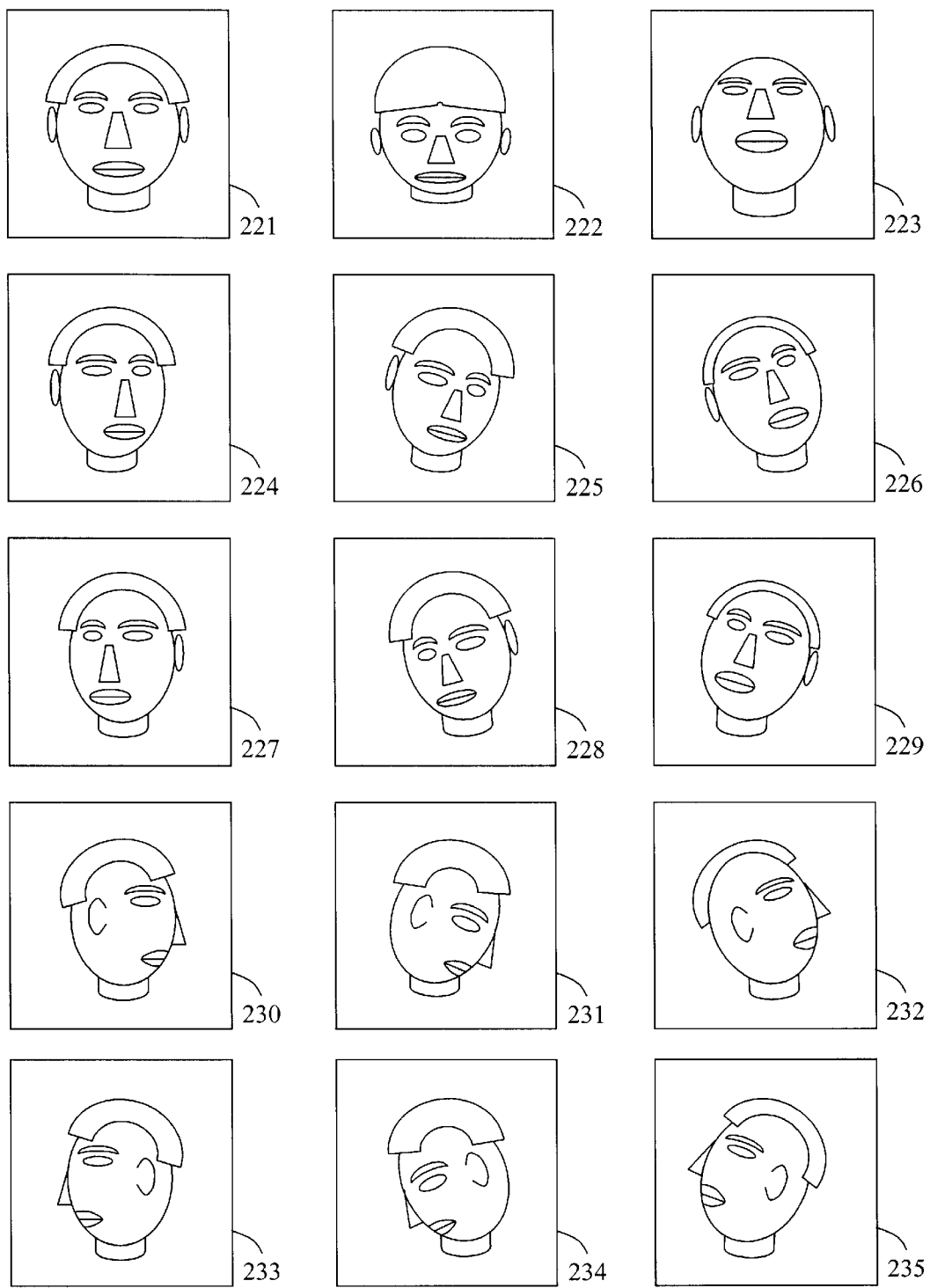
FIG. 5 is a diagram illustrating the method of acquiring a plurality of images of a person's face using the camera.

Referring to FIGS. 3 and 5, in the second step 120, a plurality of 2-D images of the person's face in the same neutral state are captured with the camera from different directions. The neutral state for the face means that all face muscles are relaxed, eyes are normally open, mouth is closed and lips are in contact. These images are subsequently used to obtain the neutral geometry of the face model, hence, hereinafter they are referred to as the neutral images. The camera directions to capture neutral images are selected so that the majority of facial features such as eyes, eyebrows, ears, nose and lips are visible in all images. The face is not required to be at the same distance from the camera in all the neutral images.

Still referring to FIG. 5, in a preferred embodiment of the present invention, fifteen camera directions selected for obtaining the neutral images. In order to obtain the neutral images, the camera remains fixed and the person rotates his/her head to realize the following fifteen different directions: front 221, forehead 222, chin 223, angled-right 224, angled-right-tilted-down 225, angled-right-tilted-up 226, angled-left 227, angled-left-tilted-down 228, angled-left-tilted-up 229, full-right-profile 230, full-right-profile-tilted-down 231, full-right-profile-tilted-up 232, full-left-profile 233, full-left-profile-tilted-down 234, and full-left-profile-tilted-up 235.

B2. Acquiring Action Images of the Face (Step 122)

Referring to FIGS. 3 and 6, in the second step 120, a plurality of 2-D images of the person's face in action states are captured with the camera from different directions. The action states for the face include faces with a smiling mouth, a yawning mouth, raised eyebrows, etc. These images are subsequently used to obtain the action geometries of the face model, hence, hereinafter they are referred to as the action images. The camera directions to capture the action images are selected so that the majority of facial features such as eyes, eyebrows, ears, nose and lips are visible in all images. The face is not required to be at the same distance from the camera in all the action images.

Still referring to FIG. 6, in a preferred embodiment of the present invention, five facial action states and two camera directions for each action are selected. The facial action states are as follows: smiling mouth, yawning mouth, kissing mouth, raised eyebrows, and squeezed eyebrows. The camera directions are front and right. In order to obtain the action images, the camera remains fixed and the person rotates his/her head while his/her face assumes an action state to capture the following ten different images: front-yawning-mouth 241, right-angled-yawning-mouth 242, front-smiling-mouth 243, right-angled-smiling-mouth 244, front-kissing-mouth 245, right-angled-kissing-mouth 246, front-raised-eyebrows 247, right-angled-raised-eyebrows 248, front-squeezed-eyebrows 249, right-angled-squeezed-eyebrows 250.

C. Calculating Facial Dimensions and the Position and Orientation of the Face in the Acquired Images (Step 130)

Referring to FIG. 3, the method of calculating the facial dimensions and the position and orientation of the face in the acquired images comprises the steps of (1) specifying feature points of the face (Step 131); (2) locating the feature points on the neutral and action images (Step 132); (3) calculating the 3-D positions of the feature points (Step 133); and (4) calculating the position and orientation of the face in the neutral and action images (Step 134). In the following, a detailed description of these steps is given.

C1. Specifying Feature Points of the Face (Step 131)

Figure 7:
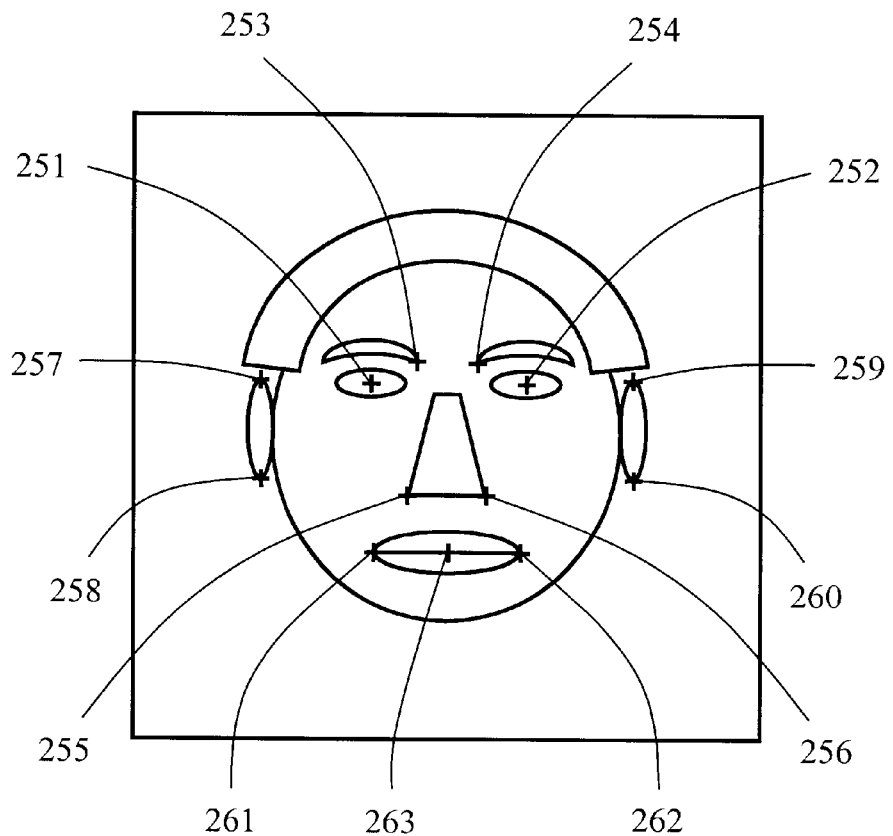
FIG. 7 is a diagram illustrating the methods of specifying and locating the feature points of the face.

A plurality of clearly identifiable and sparsely distributed points on the face are selected as the feature points. Referring to FIG. 7, in a preferred embodiment of the present invention, the following thirteen locations on the person's face are specified as the feature points: the centers of the right 251 and left 252 eye pupils, the central end points of the right 253 and left 254 eyebrows, the right 255 and left 256 corners of the nose, the top 257 and bottom 258 points of the right ear, the top 259 and bottom 260 points of the left ear, the right 261 and left 262 corners of the mouth, and the mid-point 263 of the line where the upper and lower lips contact each other.

C2. Locating the Feature Points on the Neutral and Action Images (Step 132)

The feature points are automatically located or manually marked on the acquired images. It is important to note that not all feature points may be visible in all neutral and action images and some feature points are not in their neutral position in some action images. Thus, in the present invention, the location of only the visible feature points and feature points that are in their neutral position are automatically detected or manually marked in each neutral and action image.

In a preferred embodiment of the invention, the feature points are manually marked in the neutral images that are indicated with an X in the table in FIG. 8, and are manually marked in action images that are indicated with an X in FIG. 9. The feature points are assumed as invisible in those neutral images that are not indicated with an X in the table in FIG. 8. The feature points are not in their neutral position in those action images that are not indicated with an X in the table in FIG. 9. In operation, the computer program prompts the user to manually mark only the visible feature points and feature points that are in their neutral position in each image.

C3. Calculating the 3-D Positions of the Feature Points (Step 133)

Given the 2-D locations of the feature points in the neutral images where they are visible, and the value of the E parameter of the camera obtained in Step 110, the 3-D positions of the feature points of the person's face are calculated using a modified version of the method in "Shape and Motion from Image Streams under Orthography: A Factorization Method" by Carlo Tomasi and Takeo Kanade, *International Journal of Computer Vision*, vol. 9, no. 2, pp. 137–154, 1992. In the following, first, a general mathematical analysis of 2-D image projections of 3-D feature points is given. Next, the method of "Shape and Motion from Image Streams under Orthography" is reviewed. Then, the proposed modification to the method of "Factorization of Shape and Motion" is presented.

Without loss of generality, assume that the coordinate axes of the camera system are the unit vectors $\hat{i}=(1,0,0)$, $\hat{j}=(0,1,0)$, and $\hat{k}=(0,0,1)$. Hence, the image plane passes at $(0,0,-F)$ and is perpendicular to $\hat{k}$. Let N denote the number of feature points and $P_n$, $n=1,\ldots,N$, denote the coordinates of the feature points with respect to the origin $(0,0,0)$ of the camera system. Clearly, as the person's face is moved, the coordinates, $P_n$, $n=1,\ldots,N$, of all the feature points are changed. It is therefore more appropriate to use a local coordinate system for the face to represent the coordinates of the feature points. Let the unit vectors $\tilde{i}$, $\tilde{j}$, and $\tilde{k}$ denote the coordinate axes for an arbitrary local coordinate system for the face. The origin $C_0$ of the local coordinate system is defined to be the centroid of the feature points and is given by $$C_0 = \frac{1}{N} \sum_{n=1}^{N} P_n.$$

Furthermore, let $A_n$, $n=1,\ldots,N$, denote the coordinates of the feature points with respect to the origin of the local coordinate system. Thus, as the person's face is moved, the origin of the local coordinate system is changed but the local coordinates of the feature points always remain fixed.

In order to relate the global coordinates $P_n$, $n=1,\ldots,N$, to the local coordinates $A_n$, $n=1,\ldots,N$, define the unit vectors $\hat{I}=(\tilde{i}_x, \tilde{j}_x, \tilde{k}_x)$, $\hat{J}=(\tilde{i}_y, \tilde{j}_y, \tilde{k}_y)$, and $\hat{K}=(\tilde{i}_z, \tilde{j}_z, \tilde{k}_z)$, where the subscripts x, y, and z, denote the coordinates of the respective vectors along the axes $\hat{i}$, $\hat{j}$, and $\hat{k}$ of the global coordinate system. Then, the relationship between the global coordinates and the local coordinates of the feature points is given by $$P_{n,x} = C_{0,x} + A_n \bullet \hat{I},$$

$$P_{n,y} = C_{0,y} + A_n \bullet \hat{J}, \text{ and}$$

$$P_{n,z} = C_{0,z} + A_n \bullet \hat{K},$$

where • denotes the inner product of two vectors. Finally, the 2-D coordinates of the feature points projected on the image plane are expressed as $$p_{n,x} = \frac{1}{E}\frac{P_{n,x}}{P_{n,z}} = \frac{1}{E}\frac{C_{0,x} + A_n \cdot \hat{I}}{C_{0,z} + A_n \cdot \hat{K}}, \text{ and}$$

$$p_{n,y} = \frac{1}{E}\frac{P_{n,y}}{P_{n,z}} = \frac{1}{E}\frac{C_{0,y} + A_n \cdot \hat{J}}{C_{0,z} + A_n \cdot \hat{K}},$$

where the quantities on the left hand side are in units of pixels while the quantities of the right hand side, except the E parameter and the unit vectors, are in units of meters. The above equations can be rewritten with all quantities in units of pixels as follows:

$$p_{n,x} = \frac{C_{0,x} + S_n \cdot \hat{I}}{\lambda + ES_n \cdot \hat{K}}, \text{ and}$$

$$p_{n,y} = \frac{C_{0,y} + S_n \cdot \hat{J}}{\lambda + ES_n \cdot \hat{K}},$$

where $$c_{0,x} = \frac{C_{0,x}}{EW}, \quad c_{0,y} = \frac{C_{0,y}}{EW}, \quad \lambda = \frac{C_{0,z}}{W}, \text{ and } S_n = \frac{A_n}{EW},$$

where W is some constant in units of meters that will be defined shortly.

It is now time to write the above equations for all neutral images. Suppose the number of neutral images is F, then the perspective projection equations for 2-D feature points are $$p_{n,x}^f = \frac{C_{0,x}^f + S_n \cdot \hat{I}^f}{\lambda^f + ES_n \cdot \hat{K}^f}, \text{ and}$$

$$p_{n,y}^f = \frac{C_{0,y}^f + S_n \cdot \hat{J}^f}{\lambda^f + ES_n \cdot \hat{K}^f},$$

where $f=1,\ldots,F$, denotes the image number. Note that all quantities in the above equations vary with the image number, except for the local coordinates of the feature points and of course the E parameter. The parameter W has the same value for all $f=1,\ldots,F$, otherwise its value is arbitrary.

The method of "Shape and Motion from Image Streams under Orthography" assumes a special form of 2-D projection, namely, the orthographic projection. In orthographic projection, it is assumed that $C_{0,z}$ is the same for all images, $W=C_{0,z}$, and $W\gg 1$. Thus, the above perspective projection equations reduce to the following form in the case of orthographic projections:

$$p_{n,x}^f = c_{0,x}^f + S_n \bullet \hat{I}^f, \text{ and}$$

$$p_{n,y}^f = c_{0,x}^f + S_n \bullet \hat{J}^f.$$

The quantities on the left hand side are measured quantities while the quantities on the right hand side are unknown quantities. The method of "Factorization of Shape and Motion" solves the above equations for the 3-D local coordinates $S_n$ of the feature points, and the orientation vectors $\hat{I}^f$ and $\hat{J}^f$ and the 2-D position $(c_{0,x}^f, c_{0,y}^f)$ of the centroid of the feature points in all images in terms of the 2-D projected positions $(p_{n,x}^f, p_{n,y}^f)$ of the feature points in all images.

In the following, a modification to the method of "Shape and Motion from Image Streams under Orthography" is presented in order to solve the perspective 2-D projection equations repeated below $$p_{n,x}^f = \frac{C_{0,x}^f + S_n \cdot \hat{I}^f}{\lambda^f + ES_n \cdot \hat{K}^f}, \text{ and}$$

$$p_{n,y}^f = \frac{C_{0,y}^f + S_n \cdot \hat{J}^f}{\lambda^f + ES_n \cdot \hat{K}^f},$$

for the 3-D local coordinates $S_n$ of the feature points and the orientation vectors $\hat{I}^f$ and $\hat{J}^f$, the 2-D position $(c_{0,x}^f, c_{0,y}^f)$ of the centroid of the feature points, and the distance ratio $\lambda^f$ in all images in terms of the 2-D projected positions $(p_{n,x}^f, p_{n,y}^f)$ of the feature points in all images. Note that the third orientation vector $\hat{K}^f$ is uniquely defined by the first two orientation vectors $\hat{I}^f$ and $\hat{J}^f$ simply as $$\hat{K}^f = \hat{I}^f \times \hat{J}^f,$$

where × denotes the vector outer product. The proposed modification method is an iterative procedure whose steps are as given below:

1. Use the motion-and-shape-estimation method of "Shape and Motion from Image Streams under Orthography" that employs the orthographic projection equations to calculate $S_n$ for n=1, ..., N, and $\hat{I}^f$, $\hat{J}^f$ and $(c^f_{0,x}, c^f_{0,y})$ for f=1, ..., F, given the 2-D measurements $(p^f_{n,x}, p^f_{n,y})$ and the visibility information of the feature points. Let $\hat{K}^f = \hat{I}^f \times \hat{J}^f$.

2. Calculate $\lambda^f$ for f=1, ..., F, using the perspective projection equations as $$\lambda^f = \frac{1}{\sum_{n=1}^{N} \|(p^f_{n,x}, p^f_{n,y})\|} \sum_{n=1}^{N} (\|(c^f_{0,x} + S_n \cdot \hat{I}^f, c^f_{0,y} + S_n \cdot \hat{J}^f)\| - \|(p^f_{n,x}, p^f_{n,y})\| ES_n \cdot \hat{K}^f)$$

3. Modify the 2-D measurements $(p^f_{n,x}, p^f_{n,y})$ for n=1, ..., N, and for f=1, ..., F, using the calculated values in Steps 1 and 2 as $p^f_{n,x} \leftarrow p^f_{n,x}(\lambda^f + ES_n \cdot \hat{K}^f)$, and $p^f_{n,y} \leftarrow p^f_{n,y}(\lambda^f + ES_n \cdot \hat{K}^f)$.

4. Repeat Steps 1, 2, and 3 until a predetermined number of iterations has been reached, or the following average measurement of matching error $$\varepsilon = \left( \frac{1}{V} \sum_{f=1}^{F} \sum_{n=1}^{N} \left\| \left( p^f_{n,x} - \frac{c^f_{0,x} + S_n \cdot \hat{I}^f}{\lambda^f + ES_n \cdot \hat{K}^f}, p^f_{n,y} - \frac{c^f_{0,y} + S_n \cdot \hat{J}^f}{\lambda^f + ES_n \cdot \hat{K}^f} \right) \right\|^2 \right)^{\frac{1}{2}}$$

goes below a predetermined threshold, where the summation is only over the visible points in each image, the quantity V denotes the total number of visible points in all images, and $(p^f_{n,x}, p^f_{n,y})$ are the original 2-D measurements. In a preferred embodiment of the invention, the number of iterations is selected to be 50 and the threshold is selected to be 1 pixel.

The 3-D positions $S_n$, n=1, ..., N, of the feature points are globally translated and rotated so that they correspond to a frontal-looking face. In a preferred embodiment of the invention, the 3-D positions of the feature points right-ear-top 257, left-ear-top 259, right-pupil 251, left-pupil 252, and lip-center 263 are used to globally translate and rotate the the 3-D positions $S_n$, n=1, ..., N, so that they correspond to a frontal-looking face. Let $r_1$ and $r_2$ denote the 3-D positions of the right-ear-top 257 and left-ear-top 259, respectively; $f_1$ and $f_2$ denote the 3-D positions of the right-pupil 251 and left-pupil 252, respectively; and b denote the 3-D position of the lip-center 263. Then, the following procedure is used to globally translate the positions $S_n$, n=1, ..., N, of the feature points:

1. Define the following vector $$c = \frac{1}{2}(r_1 + r_2).$$

2. Subtract c from each $S_n$, i.e., $S_n \leftarrow S_n - c$ so that the center of the feature points is shifted to the mid-point of the right-ear-top 257 and the left-ear-top 259.

Following the global translation of the feature points, in a preferred embodiment of the invention, the following procedure is used to globally rotate the feature points so that they correspond to a frontal looking face:

1. Define the following three vectors $$u = r_2 - r_1, \quad v = \frac{1}{2}(f_1 + f_2) - b, \quad \text{and} \quad w = \frac{1}{2}(f_1 + f_2) - \frac{1}{2}(r_1 + r_2).$$

2. Use the Gram-Schmidt orthonormalization procedure to convert the vectors u, v, and w into an orthonormal set of vectors. As a result, u simply will be normalized; only the component of v that is perpendicular to u will be retained and subsequently normalized; and only the component of w that is perpendicular to both u and the modified v will be retained and subsequently normalized.

3. Form the 3×3 rotation matrix T so that the columns of T consist of the orthonormalized vectors u, v, w, i.e., $T = [u \ v \ w]$.

4. Finally, left-multiply each $S_n$ with T, i.e., $S_n \leftarrow T S_n$.

C4. Calculating the Position and Orientation of the Face in the Neutral and Action Images (Step 134)

Given the 3-D positions $S_n$ for n=1, ..., N, of the feature points of the person's face obtained in Step 133, the 2-D measurements $(p^f_{n,x}, p^f_{n,y})$ of the feature points obtained in Step 132, and the value of the E parameter of the camera obtained in Step 110, the method of calculating the 3-D position and orientation of the person's face in the neutral and action images is disclosed in the following. It facilitates understanding to note that the 3-D position of the face in an image f is described by the centroid $(c^f_{0,x}, c^f_{0,y})$, of the feature points and the camera-distance-ratio $\lambda^f$ of the face in that image. Likewise, the 3-D orientation of the face in an image f is described by the vectors $\hat{I}^f$ and $\hat{J}^f$ in that image. The 3-D position and orientation parameters $(c^f_{0,x}, c^f_{0,y})$, $\lambda^f$, $\hat{I}^f$ and $\hat{J}^f$ are calculated using the following steps:

1. Use the motion-only-estimation method of "Factorization of Shape and Motion" that employs the orthographic projection equations to calculate $\hat{I}^f$, $\hat{J}^f$ and $(c^f_{0,x}, c^f_{0,y})$ given the 2-D measurements $(p^f_{0,x}, p^f_{0,y})$, the visibility information, and the 3-D positions $S_n$ of the feature points. Let $\hat{K}^f = \hat{I}^f \times \hat{J}^f$.

2. Calculate $\lambda^f$ using the perspective projection equations as $$\lambda^f = \frac{1}{\sum_{n=1}^{N} \|(p^f_{n,x} p^f_{n,y})\|} \sum_{n=1}^{N} (\|(c^f_{0,x} + S_n \cdot \hat{I}^f, c^f_{0,y} + S_n \cdot \hat{J}^f)\| - \|(p^f_{n,x} p^f_{n,y})\| ES_n \cdot \hat{K}^f)$$

3. Modify the 2-D measurements $(p^f_{n,x}, p^f_{n,y})$ for n=1, ..., N, using the calculated values in Step 1 and 2 as $p^f_{n,x} \leftarrow p^f_{n,x}(\lambda^f + ES_n \cdot \hat{K}^f)$, and $p^f_{n,y} \leftarrow p^f_{n,y}(\lambda^f + ES_n \cdot \hat{K}^f)$.

4. Repeat Steps 1, 2, and 3 until a predetermined number of iterations has been reached, or the following average measurement of matching error $$\varepsilon^f = \left(\frac{1}{U}\sum_{n=1}^{N}\left\|\left(p_{n,x}^f - \frac{c_{0,x}^f + S_n \cdot \hat{I}^f}{\lambda^f + ES_n \cdot \hat{K}^f},\ p_{n,y}^f - \frac{c_{0,y}^f + S_n \cdot \hat{J}^f}{\lambda^f + ES_n \cdot \hat{K}^f}\right)\right\|^2\right)^{\frac{1}{2}}$$

for the image goes below a predetermined threshold, where the summation is only over the visible points in the image, the quantity U denotes the total number of visible points in the image, and ($p^f_{n,x}$, $p^f_{n,y}$) are the original 2-D measurements. In a preferred embodiment of the invention, the number of iterations is selected to be 50 and the threshold is selected to be 1 pixel.

D. Obtaining the Geometry and Shape Meshes for the Neutral and Action Faces (Step 150)

Referring to FIG. 3, the method of obtaining the geometry and shape meshes for the neutral and action faces comprises the steps of (1) selecting and initial geometry mesh for the face (Step 151), (2) making global modifications to the geometry mesh according to the 3-D position data of the feature points (Step 152); (3) making local modifications to the geometry mesh to match the shape of the person's face (Step 153); and (4) defining the shape meshes for the action faces (Step 154). In the following, a detailed description of these steps is given.

D1. Selecting an Initial Geometry Mesh for the Face (Step 151)

Figure 10:
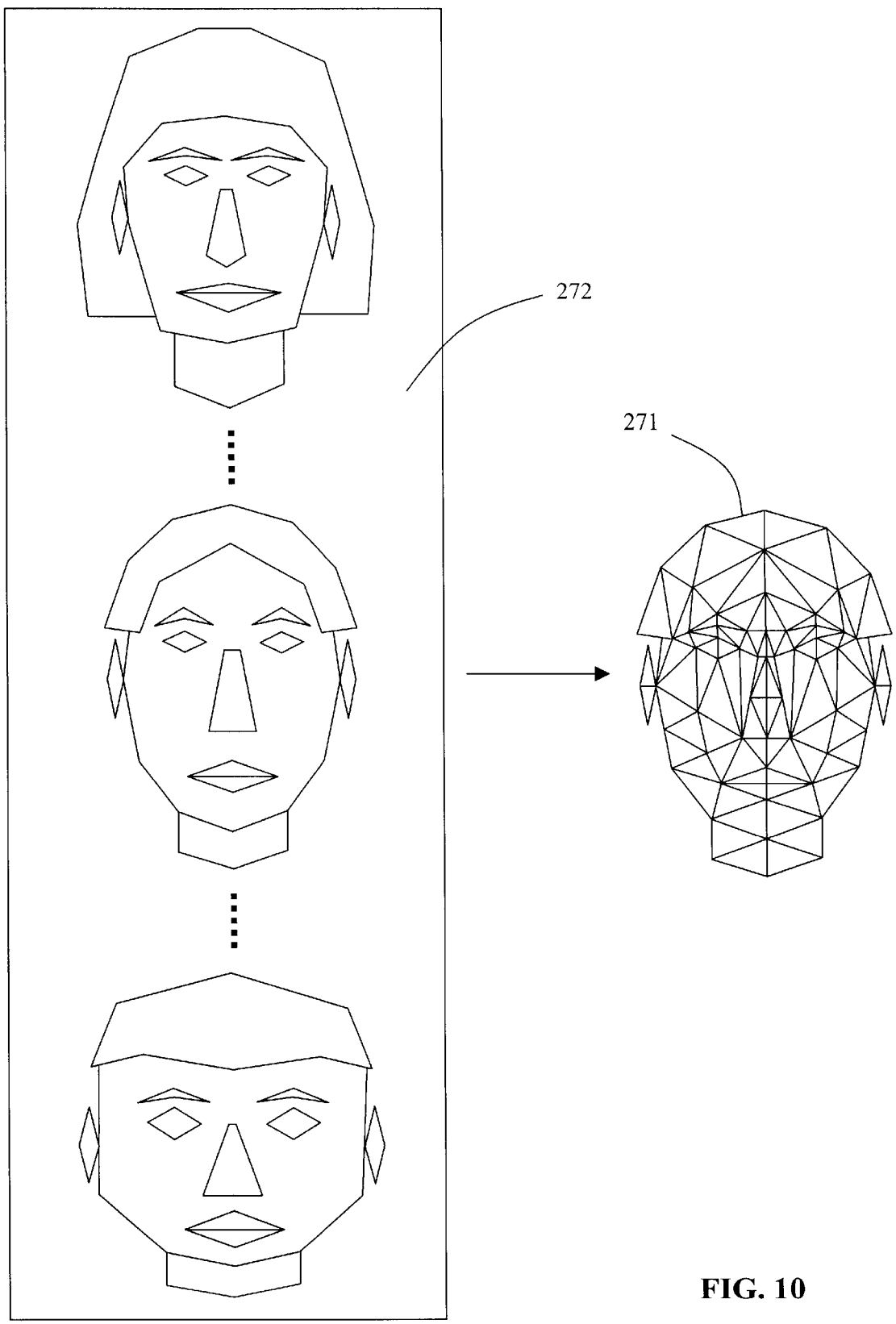
FIG. 10 is a diagram illustrating the method of selecting an initial geometry mesh for the face.

Referring to FIG. 10, a user selects an initial geometry mesh 271 among a collection 272 of standard predefined geometry meshes that best fits the facial type of the person. The facial type of the person includes the skull type, hair type, nose type, and chin type. In a preferred embodiment of the invention, a user is provided with separate collections of 3-D triangular meshes that represent different skull types, hair types, nose types, and chin types, and is allowed to stitch together a selection from each collection of facial parts to obtain the initial geometry mesh for the person's face. Although we have disclosed triangular meshes, those skilled in the art will understand that any other polygonal mesh could be substituted for the triangular mesh.

D2. Making Global Modifications to the Geometry Mesh According to the 3-D Position Data of the Feature Points (Step 152)

Figure 11:
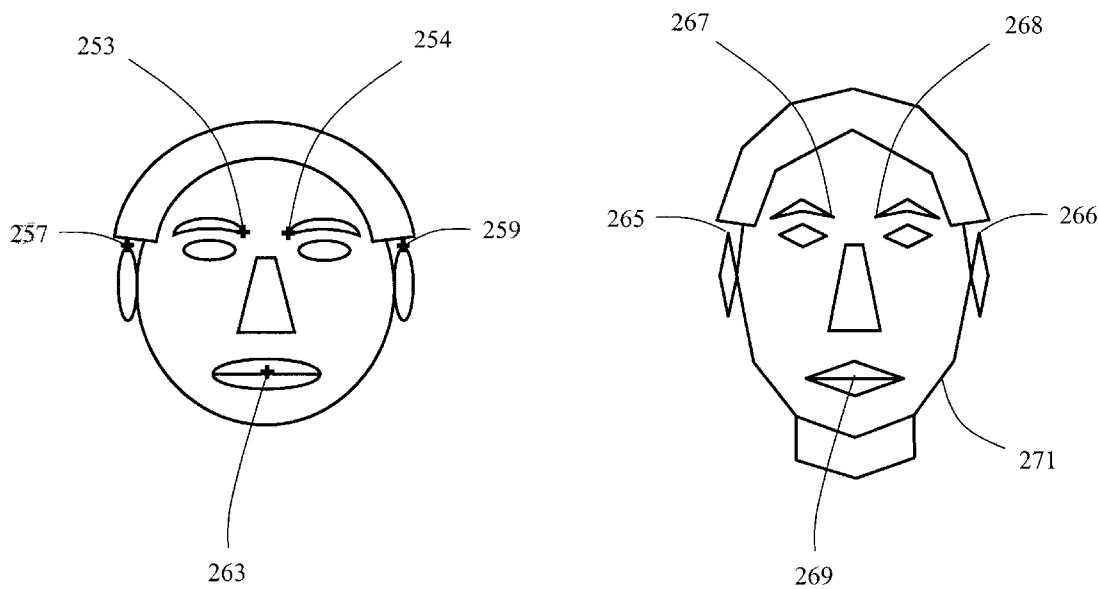
FIG. 11 is a diagram illustrating the method of making global modifications to the geometry mesh.

Referring to FIG. 11, the globally translated and rotated 3-D positions of the feature points of the person's face obtained in Step 133 are used to globally deform the initial geometry mesh 271 to match the relative positions of the feature points on the globally deformed geometry mesh 273 and to match the global proportions of the person's face. In a preferred embodiment of the invention the 3-D positions of the feature points right-ear-top 257, left-ear-top 259, right-eyebrow-central 251, left-eyebrow-central 252, and lip-center 263; and the 3-D positions of the corresponding geometry mesh nodes geometry-mesh-right-ear-top 265, geometry-mesh-left-ear-top 266, geometry-mesh-right-eyebrow-central 267, geometry-mesh-left-eyebrow-central 268, and geometry-mesh-lip-center 269 are used to globally scale, rotate, and shear the initial geometry mesh to match the global dimensions of the person's face.

Let $r_1$ and $r_2$ denote the 3-D positions of the right-ear-top 257 and left-ear-top 259, respectively; $f_1$ and $f_2$ denote the 3-D positions of the right-eyebrow-central 251 and left-eyebrow-central 252, respectively; and b denote the 3-D position of the lip-center 263. Then, define the following three vectors $$u = r_2 - r_1,\quad v = \frac{1}{2}(f_1 + f_2) - b,\quad \text{and}\quad w = \frac{1}{2}(f_1 + f_2) - \frac{1}{2}(r_1 + r_2).$$

Similarly, let $R_1$ and $R_2$ denote the 3-D positions of the geometry-mesh-right-ear-top 265 and geometry-mesh-left-ear-top 266, respectively; $F_1$ and $F_2$ denote the 3-D positions of the geometry-mesh-right-eyebrow-central 267 and geometry-mesh-left-eyebrow-central 268, respectively; and b denote the 3-D position of the geometry-mesh-lip-center 269. Then, define the following three vectors $$U = R_2 - R_1,\quad V = \frac{1}{2}(F_1 + F_2) - \frac{1}{2}(R_1 + R_2),\quad \text{and}\quad W = \frac{1}{2}(F_1 + F_2) - B.$$

In a preferred embodiment of the invention, the vectors u, v, w, U, V, and W are used to globally rotate, scale, and shear the initial geometry mesh 271 to match the global dimensions of the person's face. The process of rotation, scaling, and shear are carried out in that order as explained in the following:

1. Rotation: Rotate the initial geometry mesh 271 so that the vector V is aligned with the vector v.
2. Scaling: Scale the rotated geometry mesh in the x-, y-, and z-directions by the following scale factors respectively $$\frac{\|u\|}{\|U\|},\quad \frac{\|v\|}{\|V\|},\quad \frac{(\|w\|^2 - \|v\|^2)^{\frac{1}{2}}}{\|W\|}.$$

3. Shear: Shear the rotated and scaled geometry mesh 271 along the y-direction so that the rotated and scaled vector V is aligned with the vector v, i.e., left-multiply each $S_n$ with the matrix $$H = \begin{bmatrix} 1 & 0 & 0 \\ 0 & 1 & h \\ 0 & 0 & 1 \end{bmatrix},$$

where $$h = v \cdot V.$$

D3. Making Local Modifications to the Geometry Mesh to Match the Shape of the Face (Step 153)

Figure 12:
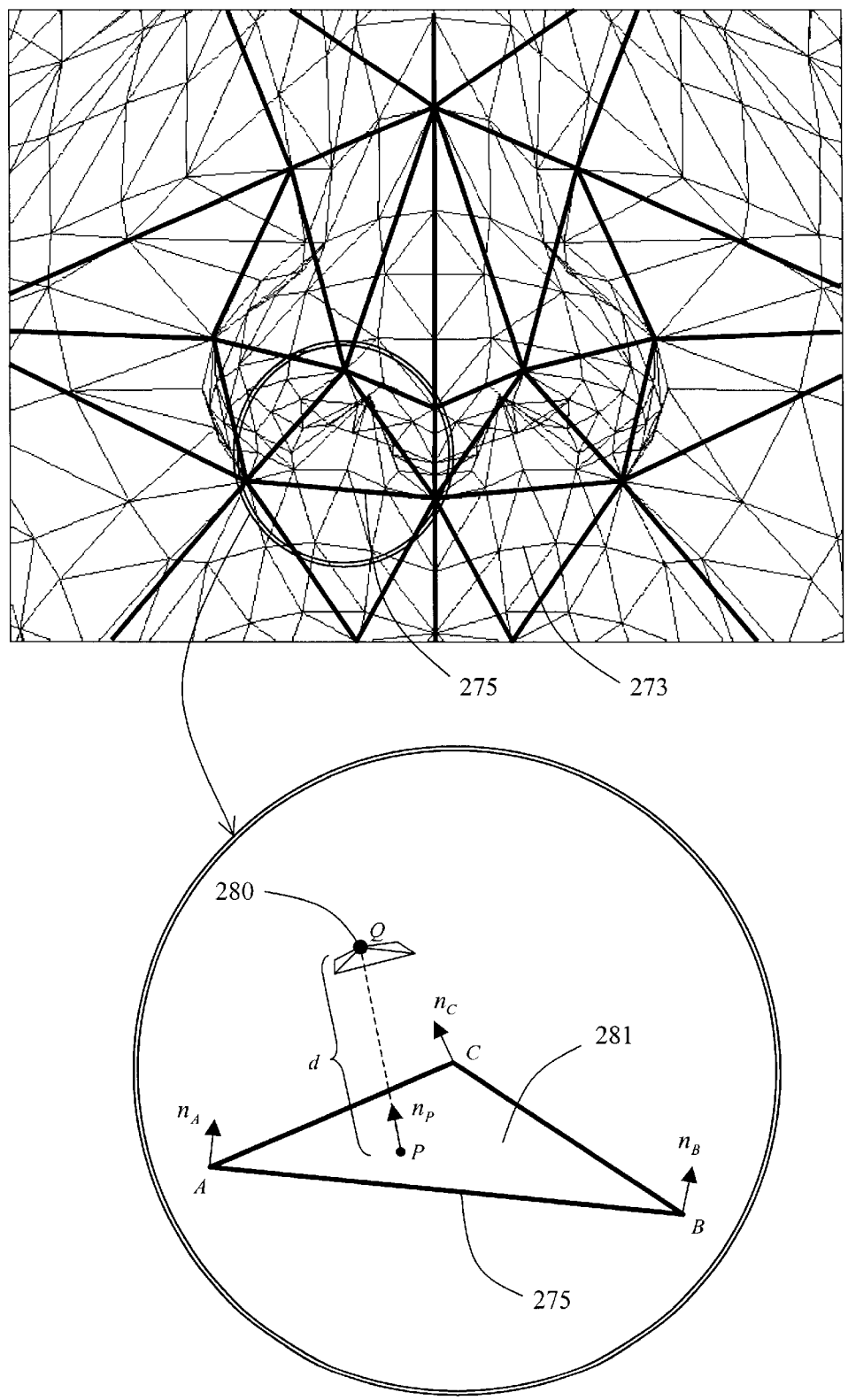
FIG. 12 is a diagram illustrating the method of making local modifications to the geometry mesh.

Referring to FIG. 12, the geometry mesh 273 obtained in Step 151 is moved and rotated in 3-D and displayed simultaneously with any image using the 3-D motion calculated in Step 134 for that image. Local adjustments are made on the geometry mesh 273 to match the local geometry of the face by moving the nodes of the geometry mesh 273 via a user interface. The nodes of the geometry mesh 273 are moved indirectly using a separate lower resolution (coarser) triangular mesh, hereinafter referred to as the shape mesh 275, overlying the geometry mesh and comprising substantially fewer and larger triangular patches than the geometry mesh. According to the method of the present invention, the user moves only the nodes of the shape mesh 275 and the nodes of the geometry mesh 273 move automatically. In a preferred embodiment of the invention, the shape mesh is selected so that the nodes of the shape mesh are selected from the nodes of the geometry mesh, i.e., a subset of the nodes of the geometry mesh 271 define the shape mesh 275. Hence the shape mesh 275 is a lower resolution mesh than the geometry mesh 271. In particular, the feature points defined in Step 131 of the present invention are included in the collection of the nodes of the shape mesh. The method of indirectly moving the nodes of the geometry mesh 273 by moving the nodes of the shape mesh 275 is disclosed in the following.

Referring to FIG. 12, each and every node 280 of the geometry mesh 273 is attached to, and hence controlled by, a triangle 281 of the shape mesh 275, following the global adjustments made to the shape 275 and the geometry mesh 273 in Step 151. The following procedure is used to attach the nodes of the geometry mesh 273 to the triangles of the shape mesh 275:

1. Calculate the normal vectors at the nodes of the shape mesh 275: Still referring to FIG. 12, the normal vector $n_A$ at the node A is obtained by averaging and the surface normals of all the triangles of the shape mesh 275 that have the node A as one of their corners. The result of the averaging is normalized so that the vector $n_A$ has unit length.

2. Define a normal vector for every point on the triangles of the shape mesh 275: Still referring to FIG. 12, the normal vector $n_P$ at the point P on the shape triangle 281 is obtained by a weighted average of the normal vectors at the corners of the shape triangle 281 as follows:

$$n_P = \alpha n_A + \beta n_B + \gamma n_C$$

where the weights $\alpha$, $\beta$ and $\gamma$ satisfy $0 \leq \alpha, \beta, \gamma \leq 1$ and are uniquely determined by solving the equation $$P = \alpha A + \beta B + \gamma C$$

under the constraint $$\alpha + \beta + \gamma = 1.$$

3. For each node of the geometry mesh 273, find a shape triangle to attach the node: A node of the geometry triangle is attached to a triangle of the shape mesh 275 only if there is a point on the triangle such that the line passing through the node and the point is parallel to the surface normal vector at the point. Still referring to FIG. 12, the node 280 of the geometry mesh 273 located at Q is attached to the triangle 281 of the shape mesh 275 because the line passing through Q and P is parallel to $n_P$. Then, it is said that the node Q 280 is attached to the triangle ABC 281 at the point P. This attachment is quantified by four numbers, namely the weights $\alpha$, $\beta$ and $\gamma$, and the distance d between the node Q 280 and the attachment point P.

Figure 13:
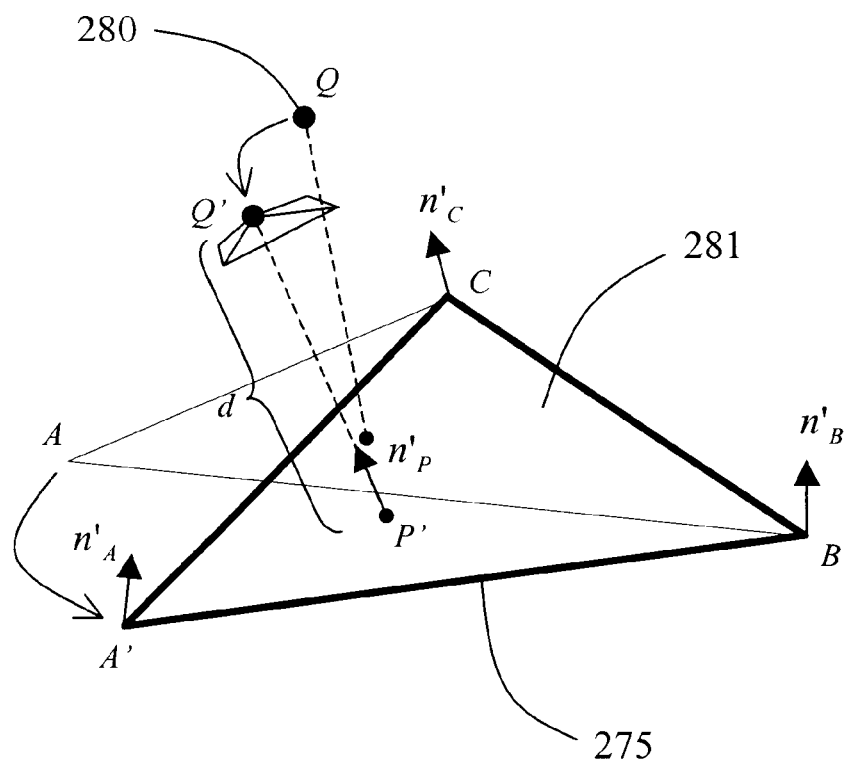
FIG. 13 is a diagram further illustrating the method of making local modifications to the geometry mesh.

Referring to FIG. 13, once the geometry mesh 273 is attached to the shape mesh 275, local modifications to the geometry mesh 273 are automatically made by moving the nodes of the shape mesh 275 as follows. When a node of the shape triangle 281 is moved from position A to position A', the point of attachment is moved automatically to a new position P' calculated as $$P' = \alpha A' + \beta B + \gamma C.$$

As the definition of the shape triangle 281 is changed from ABC to A'BC, the normal vectors at the corners A', B and C are recalculated to be $n'_A$, $n'_B$ and $n'_C$ which are then used in the following equation to yield the surface normal vector $n'_P$ at the point P' of attachment:

$$n'_P = \alpha n'_A + \beta n'_B + \gamma n'_C.$$

Finally, the moved position Q' for the node of the geometry mesh 273 is calculated as $$Q' = P' + n'_P d.$$

Figure 14:
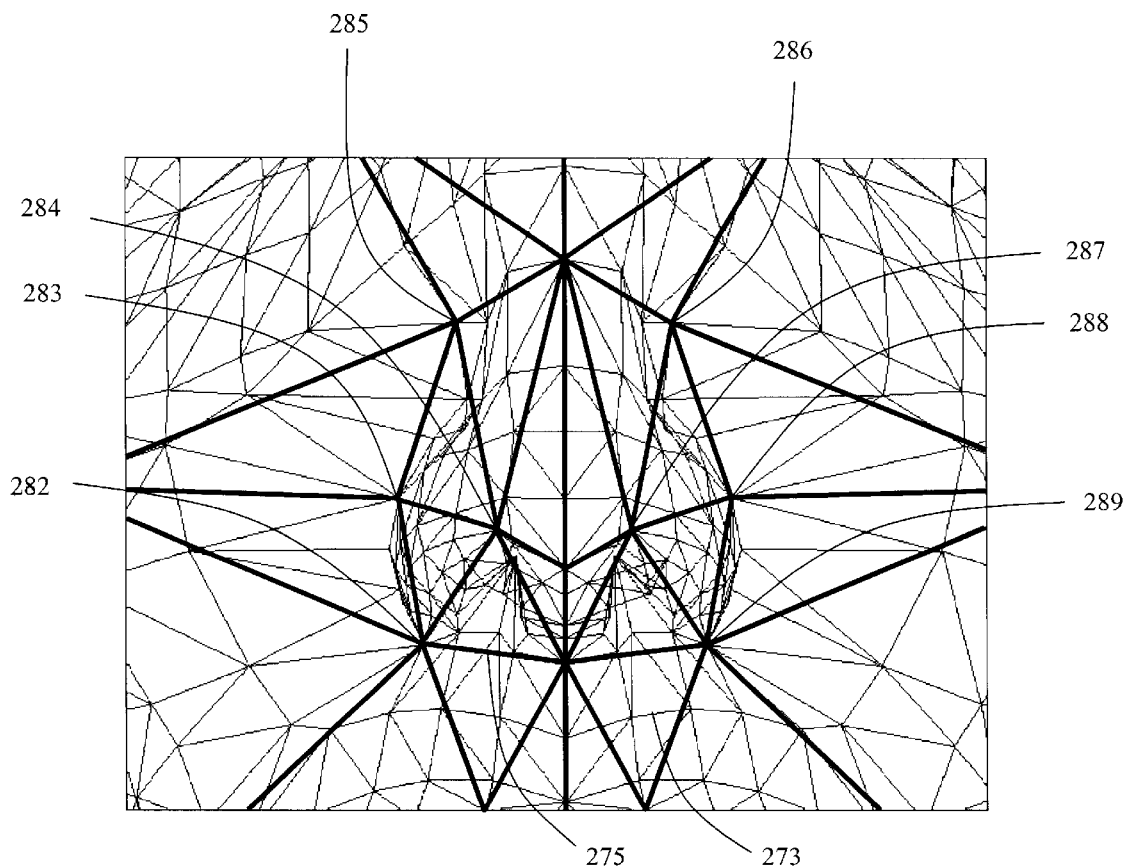
FIG. 14 is a diagram further illustrating the method of making local modifications to the geometry mesh.

Referring to FIG. 14, it helps understanding to note that by moving the appropriate nodes 282, 283, 284, 285, 286, 287, 288, 289 of the shape mesh 275, the nose part of the geometry mesh 273 is adapted to the person's nose.

In mathematical terms, let K denote the number of nodes of the shape mesh 275 and $D_n$, n=1, . . . , K, denote the positions of the nodes of the shape mesh 275 for the neutral face 221. Also, let $\alpha_k$, $\beta_k$, $\gamma_k$, $d_k$, and $m_k$ denote the attachment coefficients for the nodes of the geometry mesh 271 for k=1, . . . , L, where L denotes the number of nodes of the geometry mesh 271 and $m_k$ denotes the triangle of the shape mesh 275 controlling node k of the geometry mesh.

D4. Defining the Shape Meshes for the Action Faces (Step 154)

As part of the personalized 3-D face model, geometry mesh 273 definitions conforming to each action state of the face are also obtained. The nodes of the shape mesh 275 are moved to deform the geometry mesh 273 for each facial action state so that the deformed geometry mesh fits the geometry of the face in the action state. Let H denote the number of action faces. Referring to FIG. 6, in a preferred embodiment of the invention there are a total of 5 action states for the face, hence H=5. In mathematical terms, $D_{n,i}$, i=1, . . . , H, denote the positions of the nodes of the shape mesh 275 conforming to the action faces.

E. Creating a Texture Image for Painting the Surface of the Geometry Mesh (Step 170)

A subset of the neutral and action images are used to obtain the texture image of the face model. These images hereinafter are referred to as the shade images. Thus, the texture image is a composite of the shade images. The shade images correspond to special camera directions such as front, right, left, top, and bottom.

Referring to FIG. 3, creating the texture image for painting the surface of the geometry mesh involves the steps of (1) selecting the shade images (Step 171); and (2) blending the shade images (Step 172). In the following, a detailed description of these steps are given.

E1. Selecting the Shade Images (Step 171)

Figure 15:
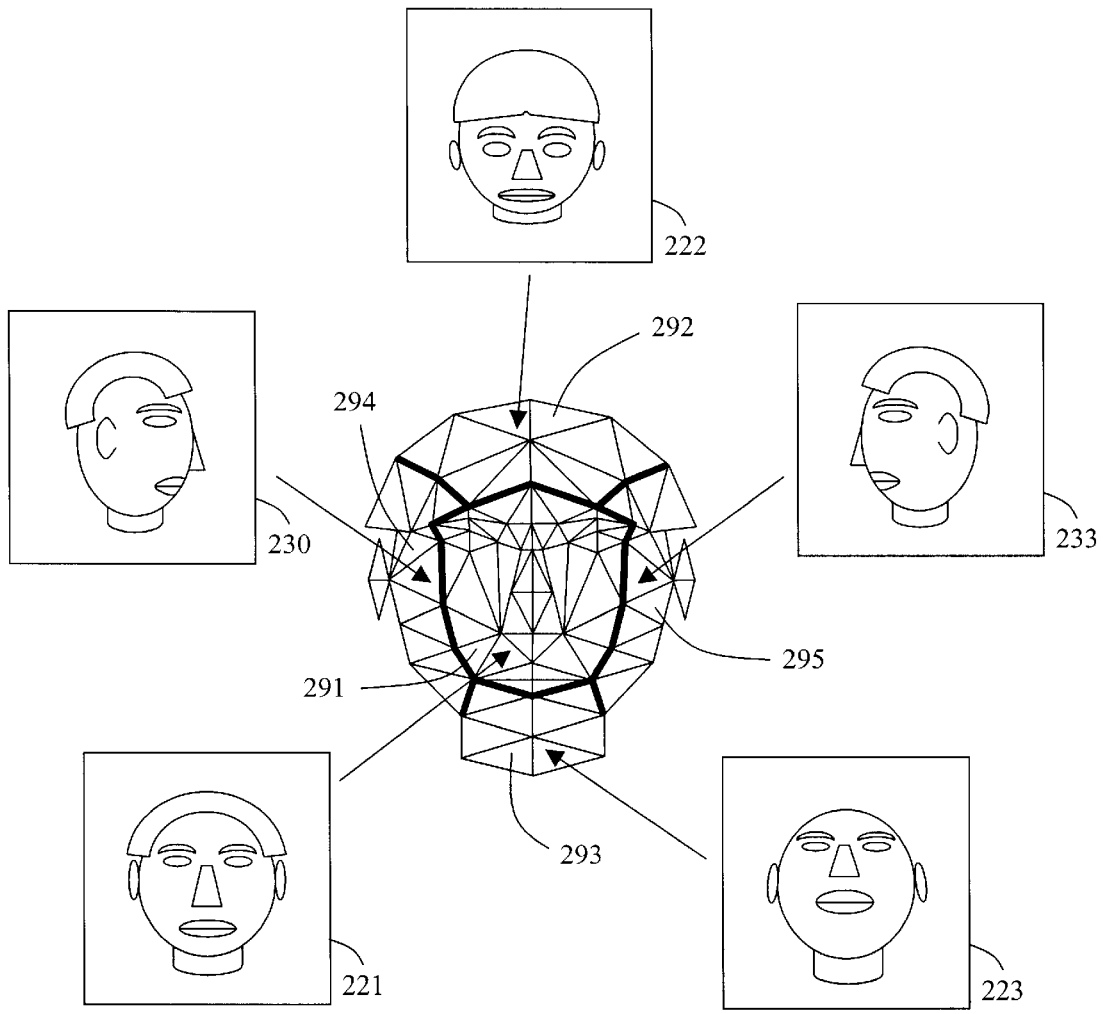
FIG. 15 is a diagram illustrating the method of selecting the shade images.
Figure 16:
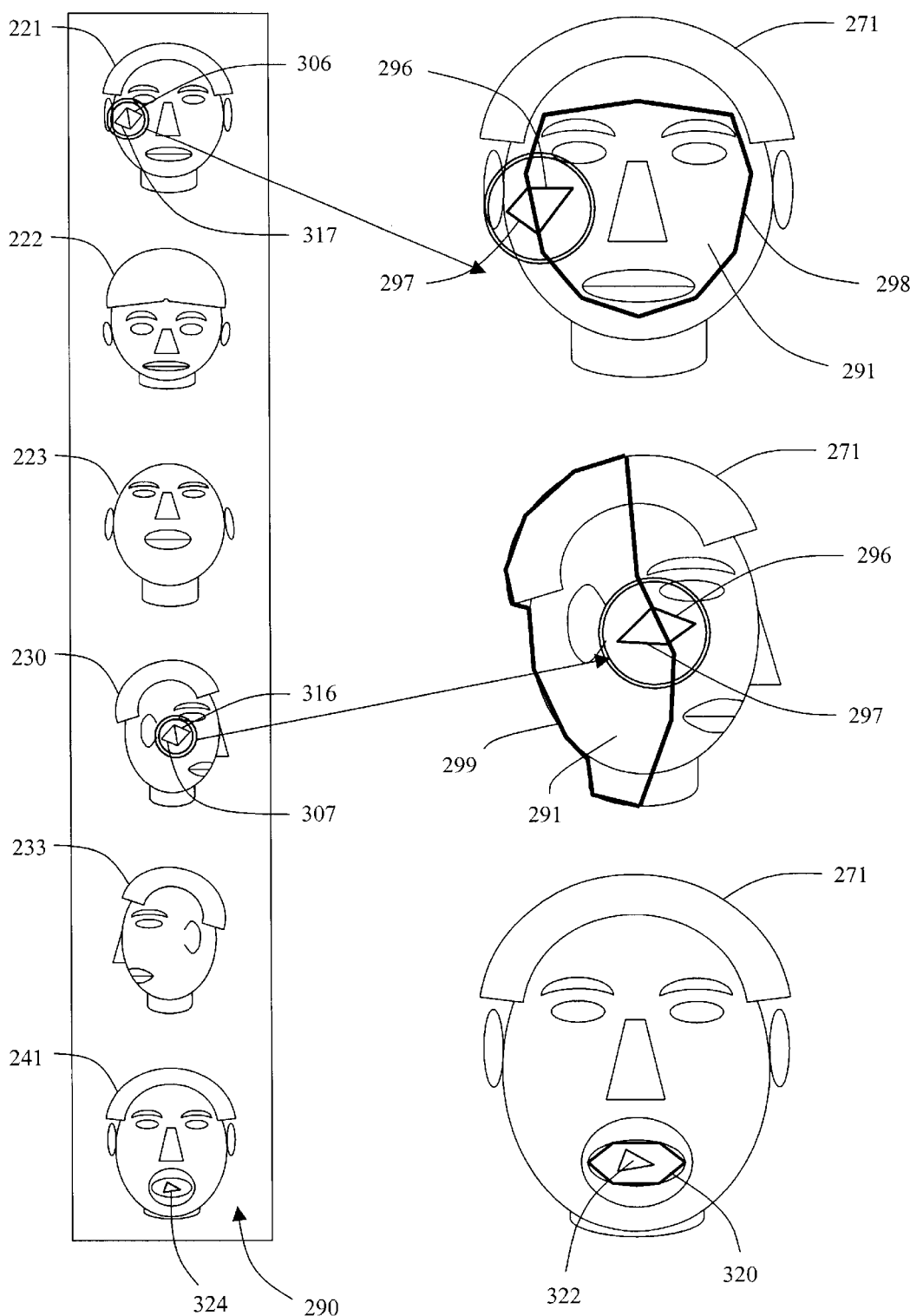
FIG. 16 is a diagram illustrating the method of blending the shade images.

Referring to FIGS. 15 and 16, a subset of the neutral and action images are selected as shade images and are used to form the texture image 290 for painting the surface of the geometry mesh 273. Suppose that the number of shade images is N, the triangles of the geometry mesh 273 are divided into N disjoint regions, hereinafter referred to as the texture regions, so that the triangles that are in the same texture region acquire their texture data from the same shade image. Shade images are selected so that the triangles in a texture region are generally more clearly visible in the shade image of the texture region than in any other shade image. It is important to note that the texture regions are selected so that the triangles that are in the same texture region are connected with each other. The polygon that forms the boundary of a texture region is referred to as the boundary polygon for that texture region. The triangles in a texture region that are on the boundary of the texture region are referred to as the boundary triangles for that texture region. The triangles that are on the boundary of a neighboring texture region are referred to as the neighboring boundary triangles for that texture region.

In a preferred embodiment of the invention, the following five neutral images and one action image are selected as the shade images: front 221, front-top 222, front-bottom 223, right-most 230, left-most 233, and yawning-mouth-front 241. The texture image 290 is formed by compositing these shade images. Still referring to FIG. 14, the corresponding texture regions are respectively referred to as front region 291, top region 292, bottom region 293, right region 294, and left region 295.

E2. Blending the Shade Images (Step 172)

Referring to FIG. 16, the method of color blending is explained on a front-boundary triangle 296 and a right-boundary triangle 297. The front-boundary triangle 296 is inside the front region 291 and on the boundary polygon of the front region 291, referred to as the front-boundary polygon 298. The right-boundary triangle 297 is inside the right region 294 and on the boundary polygon of the right region 294, referred to as the right-boundary polygon 299. The front-boundary triangle 296 and the right boundary triangle 297 are neighboring triangles.

Still referring to FIG. 16, the 2-D projection of the front-boundary triangle 296 on the front image 221 is referred to as the front-projected front-boundary triangle 306 and the 2-D projection of the front-boundary triangle 296 on the full-right-profile image 230 is referred to as the right-projected-front-boundary triangle 316. The 2-D projection of the right-boundary triangle 297 on the full-right-profile image 230 is referred to as the right-projected-right-boundary triangle 307 and the 2-D projection of the right-boundary triangle 297 on the front image 221 is referred to as the front-projected right-boundary triangle 317.

In the present invention, the color inside the front-projected-front-boundary triangle 306 is blended with the color inside the right-projected-front-boundary triangle 316, and the color inside the right-projected-right-boundary triangle 307 is blended with the color inside the front-projected-right-boundary triangle 317 to provide for a smooth transition (stitching) of color on the face model.

It is important to note that the mouth region is part of the front region 291, and the image data along its boundary is not blended with the image data of any other region.

F. Adding any Synthetic Components to the Face Model (Step 180)

If the person wears eyeglasses, earrings, etc., on his/her face, such components are added to the face model as well. If the person wears eyeglasses, then a 3-D mesh model of a pair of eyeglasses is selected from a list of candidate models that best resembles the actual pair of eyeglasses worn by the person. Similarly, if the person wears earrings, then a 3-D mesh model of a pair of earrings is selected from a collection of earrings that best resembles the actual pair of earrings worn by the person. The selected 3-D mesh models are scaled automatically to fit the dimensions of the face of the person and positioned automatically on the ears and the nose regions of the geometry mesh model 273 of the person.

G. Storing or Transmitting the Face Model (Step 190)

The face model comprises the initial geometry mesh 271; the positions of the nodes of the shape meshes for the neutral state $D_n$, n=1, . . . , K, and the action states $D_{n,i}$, i=1, . . . , H, of the face; the attachment coefficients $\alpha_k$, $\beta_k$, $\gamma_k$, $d_k$, and $m_k$, k=1, . . . , L; the texture image and the associated image-to-mesh mapping data; and any synthetic components worn on the face. The aforementioned components of the face model generated via a computer can be stored on a computer useable medium and/or transmitted over the Internet to another computer.

What is claimed is:

1. A method for controlling a first mesh representative of fine features of an object with a second mesh representative of coarse features of the object comprising the steps of:

attaching the fine mesh with a first set of nodes to the coarse mesh with a second set of nodes; and deforming the fine mesh using the coarse mesh.

2. The method of claim 1 further comprising:

providing one or more images of the object;

displaying the coarse and fine meshes over the image; and moving the nodes of the coarse mesh to conform to the coarse features of the images of the object in order to generate a 3-D model of the object.

3. The method of claim 2 wherein the object is a face and the steps further comprise:

selecting a 3-D fine geometry mesh for the face; and using the coarse mesh, adapting the 3-D fine geometry mesh in accordance with relative 3-D locations of facial features.

4. The method of claim 1 wherein the step of attaching comprises:

designing a 3-D triangular shape mesh that has less nodes than the 3-D geometry mesh;

calculating normal vectors at the nodes of the shape mesh;

defining a normal vector at every point on triangles of the shape mesh as a weighted average of the normal vectors at the nodes of the shape mesh; and finding a triangle of the shape mesh and a point on the triangle for every node of the geometry mesh so that a line passing through the node and the point is parallel to the normal vector at the point.

5. The method of claim 1 wherein the step of deforming comprises changing the 3-D geometry mesh model in accordance with the calculated orientation and position of the face in each 2-D image to provide for local modifications.

6. The method of claim 1 wherein the step of deforming further comprises generating local modifications to one or more prominent facial features.

7. The method of claim 6 further comprising the steps of selecting a fine geometry mesh model generally corresponding to the face and comprising a plurality of fine triangular patches with a node at each corner of the patch, and overlying the fine geometry mesh with a coarse shape mesh comprising substantially fewer and larger triangular patches.

8. The method of claim 7 wherein the triangles of the coarse shape mesh control the position of the nodes of the fine geometry mesh that are in the proximity of the triangles of the coarse mesh.

9. The method of claim 8 wherein the nodes of the coarse shape mesh are selectively moveable by the user and the nodes of the fine geometry mesh that are attached to the triangles of the shape mesh affected by the movement of the nodes of the shape mesh are re-positioned as a result of the following steps:

calculating surface normals of the shape mesh at attachment points of all nodes of the geometry mesh controlled by the affected triangles of the shape mesh; and obtaining the positions of the nodes of the geometry mesh by adding to their attachment points a surface vector defined as the surface distance coefficient times the surface normal of the shape mesh at respective attachment point.

10. The method of claim 7 wherein the coarse mesh encloses the periphery of the face and encloses prominent facial features.

11. The method of claim 10 wherein the prominent facial features include one or more of the group consisting of eyes, nose, mouth, chin, cheeks, ears, hair, eyebrows, neck, and forehead.

12. A method for generating a personalized 3-D face model comprising the steps of:

determining a calibration parameter of a camera;

acquiring a plurality of 2-D images of a person's face;

marking 2-D locations of one or more facial features of the face in each of the acquired images;

calculating 3-D locations of facial features in accordance with the calibration parameter of the camera;

estimating orientation and position of the face in each 2-D image;

selecting a 3-D geometry mesh for the face;

adapting the 3-D geometry mesh in accordance with the relative 3-D locations of the facial features;

attaching a 3-D shape mesh to the 3-D geometry mesh;

deforming the 3-D geometry mesh using the 3-D shape mesh to conform to the 2-D images of the face;

selecting shade images from the 2-D images of the face;

blending the shade images in accordance with the calculated orientation and position of the face in each shade image to obtain a texture image; and painting the deformed 3-D geometry mesh with the texture image to provide a 3-D model of the face.

13. The method of claim 12 wherein the step of determining the calibration parameter includes imaging a perspective view of a planar target having a plurality of point-like markings of fixed position on the target;

acquiring 2-D locations of the point-like markings;

calculating the focal length of the camera in pixel units.

14. The method of claim 13 wherein the point-like markings are arranged at corners of a square target.

15. The method of claim 12 wherein the acquired 2-D images include at least two views of the face in a neutral state at different orientations.

16. The method of claim 15 wherein the two views are orthogonal.

17. The method of claim 12 wherein the acquired 2-D images comprise front, forehead, chin, angled-right, angled-right-tilted-up, angled-right-tilted-down, angled-left, angled-left-tilted-up, angled-left-tilted-down, full-right-profile, full-right-profile-tilted-up, full-right-profile-tilted-down, full-left-profile, full-left-profile-tilted-up, and full-left-profile-tilted-down views of the face in the neutral state.

18. The method of claim 12 wherein the acquired 2-D images comprise front, forehead, chin, full-right-profile, and full-left-profile views of the face in the neutral state.

19. The method of claim 12 wherein the acquired 2-D images include a plurality of views of the face in at least one action state.

20. The method of claim 19 wherein the action states of the face comprise smiling lips, kissing lips, yawning lips, raised eyebrows, and squeezed eyebrows.

21. The method of claim 19 wherein the acquired 2-D images of the face in an action state include at least two views at different orientations.

22. The method of claim 21 wherein the two views are front and angled-right.

23. The method of claim 12 wherein the step of marking further comprises marking pupils, eyebrows, ears, nose, eye corners and mouth.

24. The method of claim 23 wherein the ears are marked at the top and bottom ends.

25. The method of claim 23 wherein the eyebrows are marked at their proximate ends.

26. The method of claim 23 wherein the pupils are marked at their centers.

27. The method of claim 23 wherein the nose is marked at the base corners.

28. The method of claim 23 wherein the mouth is marked at opposite ends and at its center.

29. The method of claim 12 wherein the step of calculating the 3-D locations of facial features further comprises:

calculating the 3-D locations of the facial features to conform to their 2-D locations in the acquired 2-D images of the face in the neutral state under an orthographic projection model;

calculating relative distances of the face to the camera in the 2-D images to conform to the 2-D locations of the facial features and their calculated 3-D locations under a perspective projection model;

modifying the 2-D locations of the facial features to conform to the calculated relative distances and the 3-D locations under a perspective projection model;

recalculating the 3-D locations of the facial features to conform to their modified 2-D locations under an orthographic projection model;

repeating the steps of calculating the relative distances, modifying the 2-D locations, and recalculating the 3-D locations to satisfy a convergence requirement; and translating and rotating the 3-D locations so that they correspond to a frontal-looking face.

30. The method of claim 12 wherein the step of estimating the orientation and position of the face in each 2-D image further comprises calculating the position and orientation of the face in a 2-D image so that the 3-D locations of the facial features conform to their 2-D locations in the 2-D image under an orthographic projection model;

calculating a relative distance of the face to the camera in the 2-D image to conform to the 2-D locations of the facial features and their calculated 3-D locations under a perspective projection model;

modifying the 2-D locations of the facial features to conform to the calculated relative distance and the 3-D locations under a perspective projection model;

recalculating the position and orientation of the face so that the 3-D locations of the facial features conform to their modified 2-D locations under an orthographic projection model; and repeating the steps of calculating the relative distance, modifying the 2-D locations, and recalculating the position and orientation to satisfy a convergence requirement.

31. The method of claim 12 wherein the step of adapting comprises changing the 3-D geometry mesh in accordance with the calculated 3-D locations of facial features to provide for global adaptations.

32. The method of claim 12 wherein the step of attaching comprises:
  designing a 3-D triangular shape mesh that has less nodes than the 3-D geometry mesh;
  calculating normal vectors at the nodes of the shape mesh;
  defining a normal vector at every point on triangles of the shape mesh as a weighted average of the normal vectors at the nodes of the shape mesh; and
  finding a triangle of the shape mesh and a point on the triangle for every node of the geometry mesh so that a line passing through the node and the point is parallel to the normal vector at the point.

33. The method of claim 12 wherein the step of deforming comprises changing the 3-D geometry mesh model in accordance with the calculated orientation and position of the face in each 2-D image to provide for local modifications.

34. The method of claim 12 wherein the step of deforming further comprises generating local modifications to the 3 D geometry mesh to conform the 3 D geometry mesh to one or more prominent facial features.

35. The method of claim 34 comprising the steps of selecting a fine geometry mesh model generally corresponding to the face and comprising a plurality of fine triangular patches with a node at each corner of the patch, and overlying the fine geometry mesh with a coarse shape mesh comprising substantially fewer and larger triangular patches.

36. The method of claim 35 wherein the triangles of the coarse shape mesh control the position of the nodes of the fine geometry mesh that are in the proximity of the triangles.

37. The method of claim 36 wherein the nodes of the coarse shape mesh are selectively moveable by the user and the nodes of the fine geometry mesh that are attached to the triangles of the shape mesh affected by the movement of the nodes of the shape mesh are re-positioned as a result of the following steps:
  calculating surface normals of the shape mesh at attachment points of all nodes of the geometry mesh controlled by the affected triangles of the shape mesh; and
  obtaining the positions of the nodes of the geometry mesh by adding to their attachment points a surface vector defined as the surface distance coefficient times the surface normal of the shape mesh at respective attachment point.

38. The method of claim 35 wherein the coarse mesh encloses the periphery of the face and encloses prominent facial features.

39. The method of claim 38 wherein the prominent facial features include one or more of the group consisting of eyes, nose, mouth, chin, cheeks, ears, hair, eyebrows, neck, and forehead.

40. The method of claim 12 wherein the step of selecting the shade images comprises selecting one or more of the images from the group consisting of the front, forehead, chin, full-right-profile, full-left-profile images.

41. The method of claim 40 wherein the step of selecting the shade images comprises selecting the front image and selecting one or more of the images from the group consisting of forehead, chin, full-right-profile, full-left-profile images.

42. The method of claim 41 wherein the step of selecting the shade images further comprises selecting full right and full left profile images of the 2-D images for texture data.

43. The method of claim 12 wherein the step of selecting the shade images comprises selecting the front image only.

44. A method for blending 2-D images of an object to paint a 3-D geometry mesh of the object comprising the steps of:
  selecting at least two 2-D images;
  defining a border on the geometry mesh where the two images meet;
  projecting the border onto the two images with the orientation and position of the object in each image; and
  interpolating color in each image on both sides of the projected border to gradually transition color from one side of the border in one image to opposite side of the border in the other image.

45. The method of claim 44 wherein color of pixels within border regions are changed in inverse proportion to the distance of the pixel from the border.

46. The method of claim 44 wherein the regions comprise triangles with at least one side or at least one corner on the border.

47. The method of claim 46 wherein the triangles are 2-D projections of corresponding 3-D triangles in the geometry mesh with the orientation and position of the object in each image.

* * * * *